(12) United States Patent
Nakano et al.

(10) Patent No.: US 11,015,740 B2
(45) Date of Patent: May 25, 2021

(54) SUPPORT MEMBER-ATTACHED WIRE HARNESS AND WIRE HARNESS SUPPORT STRUCTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Haruka Nakano, Mie (JP); Shigeki Ikeda, Mie (JP); Daisuke Fukai, Mie (JP); Tetsuya Nishimura, Mie (JP); Motohiro Yokoi, Mie (JP); Housei Mizuno, Mie (JP); Takashi Ide, Mie (JP); Daiki Nagayasu, Mie (JP); Daisuke Ebata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/619,730

(22) PCT Filed: Jun. 1, 2018

(86) PCT No.: PCT/JP2018/021128
§ 371 (c)(1),
(2) Date: Dec. 5, 2019

(87) PCT Pub. No.: WO2018/230362
PCT Pub. Date: Dec. 20, 2018

(65) Prior Publication Data
US 2020/0141518 A1  May 7, 2020

(30) Foreign Application Priority Data

Jun. 14, 2017 (JP) .............................. JP2017-116706
Sep. 19, 2017 (JP) .............................. JP2017-179110

(51) Int. Cl.
*F16L 3/12* (2006.01)
*B60R 16/02* (2006.01)
*H01B 7/40* (2006.01)

(52) U.S. Cl.
CPC ............ *F16L 3/12* (2013.01); *B60R 16/0207* (2013.01); *H01B 7/40* (2013.01)

(58) Field of Classification Search
CPC ..... B60R 16/0207; B60R 16/0215; F16L 3/12
See application file for complete search history.

(56) References Cited

U.S. PATENT DOCUMENTS

2013/0292159 A1* 11/2013 Gotou .................... H02G 3/305
                                                                174/250
2015/0340125 A1   11/2015 Huang et al.
(Continued)

FOREIGN PATENT DOCUMENTS

CN  202992387 U  6/2013
CN  103791165 A  5/2014
(Continued)

OTHER PUBLICATIONS

International Search Report issued in International Patent Application No. PCT/JP2018/021128, dated Aug. 17, 2018.
(Continued)

*Primary Examiner* — Timothy J Thompson
*Assistant Examiner* — Amol H Patel
(74) *Attorney, Agent, or Firm* — Greenblum & Bernstein, P.L.C.

(57) ABSTRACT

A support member-attached wire harness includes a wire harness including an electrical wire and a support member
(Continued)

that includes a fitting portion formed in a partially cylindrical shape that is opened partially in a circumferential direction so as to be capable of being fitted to an outer peripheral portion of a bar-shaped member. On at least one of the wire harness and the support member, a support portion for supporting the wire harness disposed along an outer periphery of the fitting portion at a fixed position with respect to the fitting portion is formed.

15 Claims, 20 Drawing Sheets

(56) References Cited

U.S. PATENT DOCUMENTS

| | | | | |
|---|---|---|---|---|
| 2015/0357085 | A1* | 12/2015 | Kinsey | H01B 7/04 |
| | | | | 174/70 R |
| 2018/0269667 | A1* | 9/2018 | Schaefer | H02G 3/0456 |

FOREIGN PATENT DOCUMENTS

| | | |
|---|---|---|
| CN | 203585548 U | 5/2014 |
| CN | 203883392 U | 10/2014 |
| CN | 104742826 A | 7/2015 |
| CN | 105097079 A | 11/2015 |
| JP | 5-10110 A | 2/1993 |
| JP | 5-10110 U | 2/1993 |
| JP | 11-7856 A | 1/1999 |
| JP | 2003-336789 A | 11/2003 |
| JP | 2014-11837 A | 1/2014 |
| JP | 2015-222627 | 12/2015 |

OTHER PUBLICATIONS

International Preliminary Report on Patentability in International Patent Application No. PCT/JP2018/021128, dated Dec. 17, 2019.
India Office Action issued in India Application No. 201917049870, dated Jun. 23, 2020.
Japan Office Action issued in Japan Application No. 2017-179110, dated Jun. 30, 2020, and English language translation thereof.
China Official Action issued in CN Application No. 201880039070.4, dated Sep. 30, 2020, and English language translation thereof.

* cited by examiner

SUPPORT MEMBER-ATTACHED WIRE HARNESS AND WIRE HARNESS SUPPORT STRUCTURE

TECHNICAL FIELD

The present invention relates to a technique for allowing a wire harness to be supported on a bar-shaped member.

BACKGROUND ART

Patent Document 1 discloses a technique for allowing a wire harness to be supported on a bar-shaped member. The wire harness support member described in Patent Document 1 includes a fitting portion to which a bar-shaped member is capable of being fitted in a form of being held, and a protective portion that is provided integrally with the fitting portion on the outer periphery of the fitting portion and covers the wire harness.

PRIOR ART DOCUMENTS

Patent Documents

Patent Document 1: Japanese Patent Application Laid-Open No. 2014-11837

SUMMARY

Problem to be Solved by the Invention

However, the wire harness support member described in Patent Document 1, which is suitable for supporting a wire harness having a round cross section, such as a bundle of electrical wires, is not suitable for supporting the wire harness flatly.

In view of the above, an object of the present invention is to provide a technique suitable for allowing a wire harness to be flatly supported on a bar-shaped member.

Means to Solve the Problem

In order to solve the above-mentioned problem, a support member-attached wire harness according to a first aspect includes a wire harness including an electrical wire, and a support member including a fitting portion formed in a partially cylindrical shape that is opened partially in a circumferential direction so as to be capable of being fitted to an outer peripheral portion of a bar-shaped member, in which a support portion for supporting the wire harness disposed along outer periphery of the fitting portion at a fixed position with respect to the fitting portion is formed on at least one of the wire harness and the support member.

A support member-attached wire harness according to a second aspect is the support member-attached wire harness according to the first aspect, in which the wire harness includes a sheet material that holds the electrical wire, and the support portion includes a locking projection portion which protrudes toward an outer peripheral side from the fitting portion and is locked in a state of penetrating the sheet material.

A support member-attached wire harness according to a third aspect is the support member-attached wire harness according to the first or second aspect, in which the wire harness includes a sheet material that holds the electrical wire, and the support portion includes a recess formed on an inner peripheral side of the sheet material, the recess into which an end portion of the fitting portion is inserted.

A support member-attached wire harness according to a fourth aspect is the support member-attached wire harness according to the third aspect, in which the recess is formed in a bag shape.

A support member-attached wire harness according to a fifth aspect is the support member-attached wire harness according to any one of the first to fourth aspects, in which the wire harness further includes a sheet material that holds the electrical wire and a connector that is connected to an end portion of the electrical wire and positioned in an end portion of the sheet material, and the support portion includes a connector locking portion which protrudes toward the outer peripheral side from the fitting portion, the connector locking portion at which the connector is locked.

A support member-attached wire harness according to a sixth aspect is the support member-attached wire harness according to the fifth aspect, in which the end portion of the sheet material is sandwiched between the connector and the fitting portion.

A support member-attached wire harness according to a seventh aspect is the support member-attached wire harness according to any one of the first to sixth aspects, in which the support portion further includes a first insertion portion and a second insertion portion that are provided at both end sides in a circumferential direction of the support member and where a band component is capable of being inserted, the support member-attached wire harness further comprising a band component that is inserted into and locked at the first insertion portion and the second insertion portion in a state where the wire harness is sandwiched between the band component and an outer peripheral surface of the support member.

A support member-attached wire harness according to an eighth aspect is the support member-attached wire harness according to the seventh aspect, in which the band component includes a band portion on which an uneven portion is formed, and a regulation portion that is provided at a base end of the band portion and has a cross section formed to be larger than a cross section of the band portion, the first insertion portion is formed such that the band portion is capable of being inserted into the first insertion portion and the regulation portion is incapable of being inserted into the first insertion portion, and a band lock portion that can be locked at the uneven portion such that the band portion is capable of being inserted into the second insertion portion in one direction and is incapable of being inserted into the second insertion portion in the other direction is formed in the second insertion portion.

A support member-attached wire harness according to a ninth aspect is the support member-attached wire harness according to any one of the first to eighth aspects, in which the support member further includes a positioning projection portion that protrudes from the fitting portion toward an inner peripheral side and is capable of being stored in a hole formed on the bar-shaped member.

A support member-attached wire harness according to a tenth aspect is the support member-attached wire harness according to the ninth aspect, in which the positioning projection portion includes a pair of fitting positioning projection portions that are provided on inner peripheral surfaces of portions positioned on opposite sides across the bar-shaped member on the fitting portion, and allow the fitting portion to be fitted to the bar-shaped member by being stored in the hole formed on the bar-shaped member.

A support member-attached wire harness according to an eleventh aspect is the support member-attached wire harness according to any one of the first to tenth aspects, in which the wire harness includes a sheet material that holds the electrical wire, and the electrical wire is fixed to the sheet material by sewing or welding.

A support member-attached wire harness according to a twelfth aspect is the support member-attached wire harness according to any one of the first to tenth aspects, in which the wire harness includes sheet materials that holds the electrical wire, and the electrical wire is formed to be flat as a whole by being sandwiched between two of the sheet materials.

A wire harness support structure according to a thirteenth aspect includes the support member-attached wire harness according to any one of the first to twelfth aspects, and the bar-shaped member to which the fitting portion of the support member-attached wire harness is fitted.

A wire harness support structure according to a fourteenth aspect is the wire harness support structure according to the thirteenth aspect, in which the wire harness includes a sheet material that holds the electrical wire, and an end portion of the sheet material is sandwiched between the bar-shaped member and the fitting portion.

A wire harness support structure according to a fifteenth aspect is the wire harness support structure according to the thirteenth or fourteenth aspect, in which the bar-shaped member is a reinforcement disposed on a back side of an instrument panel in a vehicle.

Effects of the Invention

According to the first to fifteenth aspects, the wire harness disposed along the outer periphery of the fitting portion can be supported at a fixed position with respect to the fitting portion by the support portion. For this reason, the present invention is suitable for supporting the wire harness on a bar-shaped member flatly.

Further, according to the second aspect, the support member can support the sheet material easily by the locking projection portion. Further, the sheet material is easily supported at a fixed position with respect to the support member.

Further, according to the third aspect, the support member can support the sheet material easily by inserting the fitting portion into the recess.

Further, according to the fourth aspect, the sheet material is easily supported at a fixed position with respect to the support member.

Further, according to the fifth aspect, the support member can support the sheet material easily by locking the connector into the connector locking portion.

Further, according to the sixth aspect, the circumferential end portion of the sheet material is less likely to flutter.

Further, according to the seventh aspect, the wire harness can be supported by the support member using the band component.

Further, according to the eighth aspect, the wire harness can be supported by the support member using a general-purpose binding band.

Further, according to the ninth aspect, the support member and the bar-shaped member can be easily positioned.

Further, according to the tenth aspect, a configuration for fitting and a configuration for positioning need not be provided separately.

Further, according to the eleventh aspect, a flat wire harness can be easily obtained.

Further, according to the twelfth aspect, the wire harness can be made flat even if the electrical wire is not fixed to the sheet material.

Further, according to the fourteenth aspect, the end portion of the sheet material is less likely to flutter.

DESCRIPTION OF EMBODIMENTS

First Embodiment

Figure 1:
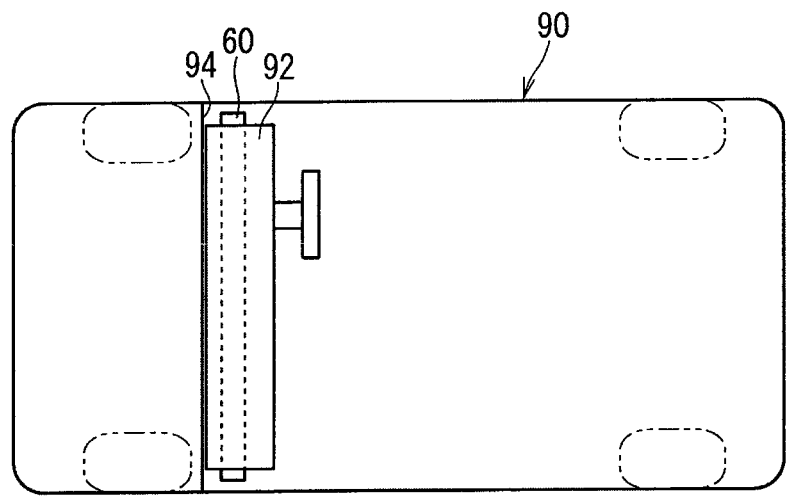
FIG. 1 is an explanatory view showing a location where a support structure of a support member-attached wire harness is applied in a vehicle.
Figure 2:
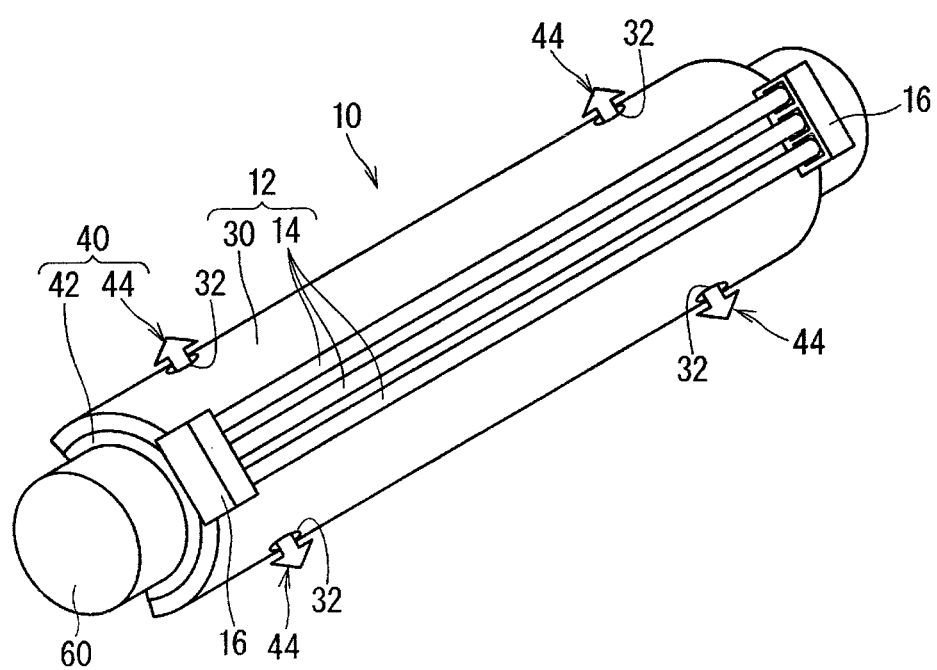
FIG. 2 is a perspective view showing a support member-attached wire harness and a support structure of the support member-attached wire harness according to a first embodiment.
Figure 3:
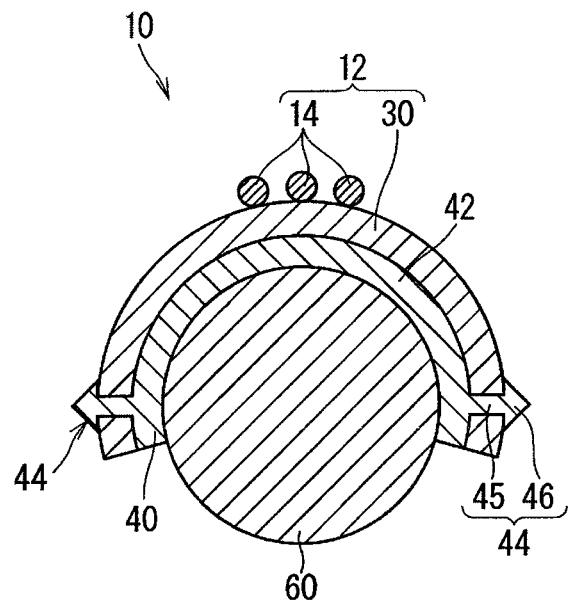
FIG. 3 is a cross-sectional view showing the support member-attached wire harness and the support structure of the support member-attached wire harness according to the first embodiment.

Hereinafter, a support member-attached wire harness and a support structure of the support member-attached wire harness according to a first embodiment will be described. FIG. 1 is an explanatory view showing a location where the support structure of the support member-attached wire harness is applied in a vehicle 90. FIG. 2 is a perspective view showing a support member-attached wire harness 10 and a support structure of the support member-attached wire harness 10 according to the first embodiment. FIG. 3 is a cross-sectional view showing the support member-attached wire harness 10 and the support structure of the support member-attached wire harness 10 according to the first embodiment.

In the support structure of the wire harness according to the present invention, a wire harness 12 is supported by a bar-shaped member 60 using a support member 40. More specifically, the wire harness 12 is supported by the support member 40. Then, the support member 40 is supported by the bar-shaped member 60. In this manner, the wire harness 12 is supported by the bar-shaped member 60 with the support member 40 interposed therebetween. For example, the wire harness 12 is transported to a vehicle assembly factory in a form in which the support member 40 is attached, that is, in the form of the support member-attached wire harness 10, and the support member 40 of the support member-attached wire harness 10 is supported by the bar-shaped member 60 in the assembly factory. The wire harness 12 and the support member 40 may be transported to a vehicle assembly factory in a separate form, and the wire harness 12 may be supported by the support member 40 and the support member 40 may be supported by the bar-shaped member 60 in the assembly factory. In this case, the wire harness 12 may be supported by the support member 40 after the support member 40 is supported by the bar-shaped member 60.

Examples of the bar-shaped member 60 include a reinforcement, a vehicle body frame, and the like. Here, an example in which the wire harness 12 is supported with respect to a reinforcement as the bar-shaped member 60 having a cylindrical peripheral surface will be described. In particular, here, as shown in FIG. 1, the bar-shaped member 60 is described as a reinforcement disposed on the back side of an instrument panel 92 (between the instrument panel 92 and a dash panel 94) in the vehicle 90.

Figure 4:
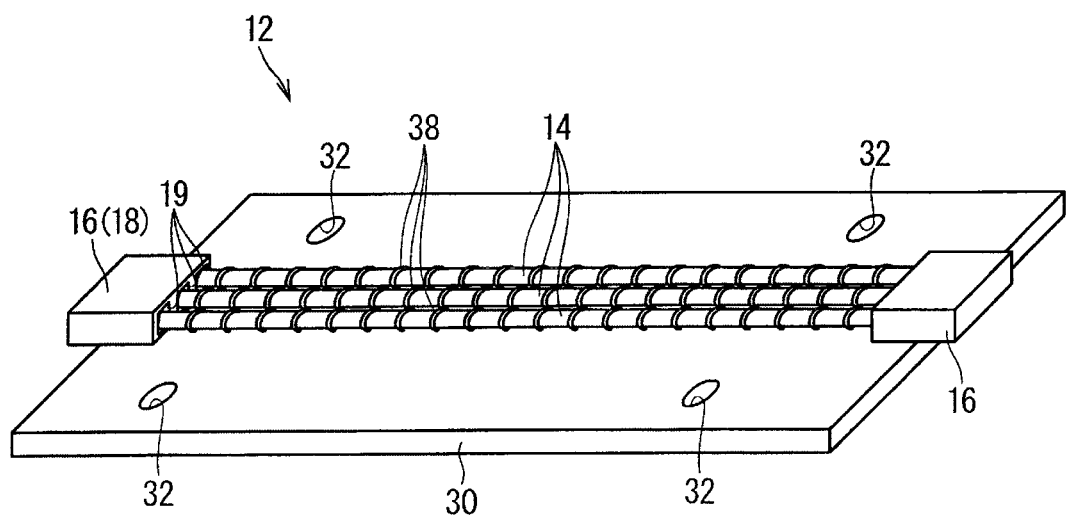
FIG. 4 is a perspective view showing a wire harness according to the first embodiment.

FIG. 4 is a perspective view showing the wire harness 12 according to the first embodiment.

The wire harness 12 includes a sheet material 30 and an electrical wire 14 disposed on the sheet material 30. The electrical wire 14 is sewn to the sheet material 30 with a thread 38. In this manner, the electrical wire 14 is fixed to the sheet material 30.

A material, a manufacturing method, and the like of the sheet material 30 are not particularly limited as long as the sheet material 30 can be bent and deformed along the outer periphery of the support member 40 and the electrical wire 14 can be fixed. For example, the sheet material 30 may be made from synthetic resin, may be made from metal, may be made from natural fibers, such as hair, cotton, or the like, or may be a combination of these. Further, for example, the sheet material 30 can be considered as a nonwoven fabric, a woven fabric, a knitted fabric, or the like. Further, for example, in a case where the sheet material 30 is made from synthetic resin, the sheet material 30 can be considered to be formed to have a uniform cross section by extrusion molding, or the like. Further, for example, in a case where the sheet material 30 is made from metal, the sheet material 30 can be considered to be rolled and formed into a foil shape.

Further, in the example shown in FIG. 4, the sheet material 30 is formed in a rectangular shape. However, the present invention is not limited to this. For example, the sheet material 30 may be formed in an L shape or the like. The sheet material 30 having such a shape is suitable in a case where the electrical wire 14 is bent and disposed. Further, for example, the sheet material 30 may be formed in a T shape or an X shape. The sheet material 30 having such a shape is suitable in a case where the electrical wires 14 are branched in the middle. That is, the sheet material 30 is preferably formed in a shape corresponding to the arrangement form of the electrical wires 14.

It is also conceivable that the sheet material 30 has uses other than fixing the electrical wire 14 and causing the support member 40 to support the fixed electrical wire 14. Examples of such uses include protection, heat dissipation, soundproofing, a tension member, and the like.

At least one of the electrical wires 14 is included. Here, a plurality of the electrical wires 14 (three in the example shown in FIG. 2) are included. The plurality of electrical wires 14 are provided in a flat state with respect to the sheet material 30. More specifically, the electrical wires 14 are fixed in a state of being separated from each other and provided in parallel. The plurality of electrical wires 14 may also be fixed in a bundled state. Here, an insulated wire including a core wire and an insulating covering covering the core wire is assumed to be employed as the electrical wire 14. The core wire is formed of a conductive material such as copper, aluminum, or the like. The core wire may be a single wire or a stranded wire. The insulating covering may be formed by extruding resin or the like on the outer periphery of the core wire, or may be formed by baking a varnish or the like applied to the outer periphery of the core wire. However, a bare core wire may be employed as the electrical wire.

A portion of the wire harness 12 provided along the bar-shaped member 60 is a support target. In the example shown in FIG. 4, the entire electrical wire 14 is fixed to the sheet material 30. In this case, as shown in FIG. 2, the entire electrical wire 14 is supported by the bar-shaped member 60. Fixation of the entire electrical wire 14 to the sheet material 30 is not an essential configuration. That the entire electrical wire 14 is supported by the bar-shaped member 60 is not an essential configuration either, as a matter of course.

Here, in the example shown in FIG. 4, all the three electrical wires 14 are fixed to the sheet material 30. In a case where the wire harness 12 includes the plurality of electrical wires 14, the electrical wire 14 that is not fixed to the sheet material 30 may be included.

Further, in the example shown in FIG. 4, all the three electrical wires 14 are connected to the same connector 16. In a case where the wire harness 12 includes the plurality of electrical wires 14, the electrical wire 14 connected to a different one of the connector 16 may be included. For example, the electrical wire 14 is connected as a terminal connected to an end portion is inserted into a cavity 19 formed in a main body portion 18 of the connector 16. Such a terminal is connected to the electrical wire by, for example, crimping, pressure contacting, welding, or the like.

Further, in the example shown in FIG. 4, the electrical wire 14 is provided linearly. The electrical wire 14 may also be bent and provided. Then, in a case where the wire harness 12 includes the plurality of electrical wires 14, the electrical wire 14 provided linearly and the electrical wire provided in a bent shape may exist together. In this case, a branch may be formed in the plurality of electrical wires 14 on the sheet material 30. Further, in this case, the plurality of electrical wires 14 may be provided in such a manner that an electrical wire crossing the other electrical wires 14 exists at a branch position on the sheet material 30.

Further, in the example shown in FIG. 4, the electrical wire 14 is provided at a position near the center in a width direction with respect to the sheet material 30. A path on which the electrical wire 14 is provided with respect to the sheet material 30 is not limited to that described above. For example, the electrical wire 14 may be provided at a position closer to an end portion in the width direction with respect to the sheet material 30. Further, for example, the electrical wire 14 may extend obliquely with respect to the sheet material 30.

An end portion of the electrical wire 14 is assembled into the connector 16. Then, in a state where the wire harness 12 is provided in a location to be provided in a vehicle or the like, the connector 16 is connected to the connector 16 on the side of various pieces of electrical equipment mounted on the vehicle or the like. In this manner, the wire harness 12 is used as wiring which electrically connects various pieces of electrical equipment mounted on a vehicle or the like.

Here, the connector 16 is also fixed to the sheet material 30. In particular, here, the connectors 16 connected to both ends of the electrical wire 14 are fixed to the sheet material 30. That the connector 16 is fixed to the sheet material 30 is not an essential configuration. In this case, in addition to a case where the connector 16 cannot be fixed to the sheet material 30 by being provided at the end portion of the electrical wire 14 extending from the sheet material 30, there may be a case where part of the connector 16 overlaps with an edge portion of the sheet material 30 while the connector 16 is not fixed to the sheet material 30.

In the example shown in FIG. 2, the electrical wire 14 is provided on one main surface side of the sheet material 30. Then, the sheet material 30 has a main surface on which the electrical wire 14 is not provided facing the support member 40 side. In the sheet material 30, the main surface on which the electrical wire 14 is provided may face the support member 40 side. In this case, the electrical wire 14 is sandwiched between the sheet material 30 and the support member 40. Further, the electrical wire 14 may be provided so as to move from one main surface side of the sheet material 30 to the other main surface side in the middle.

As a sewing method of the electrical wire 14, the electrical wire 14 may be sewn using a sewing machine, or may be sewn by hand. In a case where the electrical wire 14 is sewn using a sewing machine, for example, a case where a needle thread and a bobbin thread in the sewing machine are prepared separately from the electrical wire 14, a case where the electrical wire 14 is used for one of a needle thread or a bobbin thread in the sewing machine, and the like can be considered.

Figure 5:
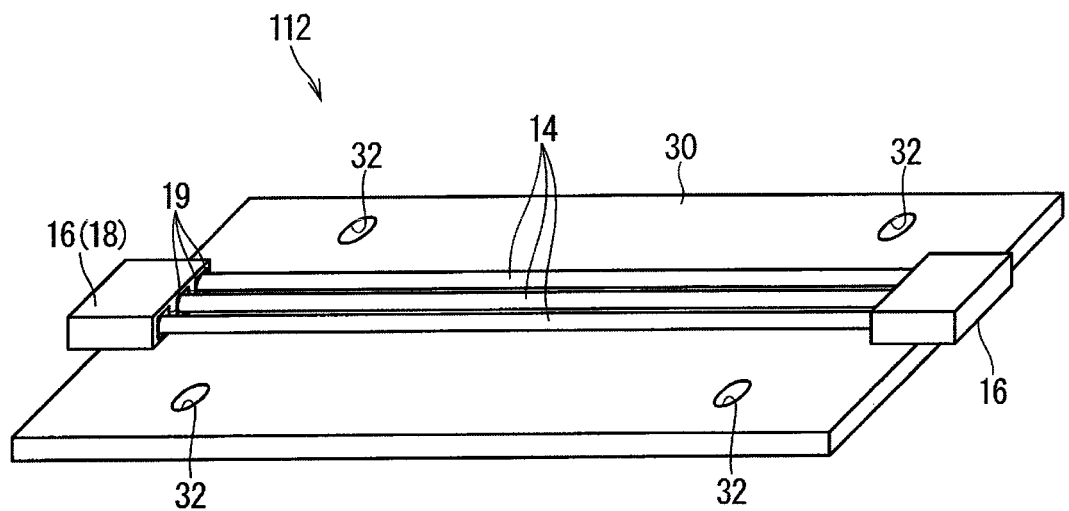
FIG. 5 is a perspective view showing a variation of the wire harness according to the first embodiment.

The method of fixing the electrical wire 14 to the sheet material 30 is not limited to sewing. For example, the electrical wire 14 may be fixed to the sheet material 30 by welding as in a wire harness 112 shown in FIG. 5. In this case, the sheet material 30 is preferably one on which the electrical wire 14 can be welded. Such a welding method may be ultrasonic welding and laser welding, thermal welding, or the like. Further, for example, the electrical wire 14 may be fixed to the sheet material 30 with an adhesive agent, an adhesive tape, or the like. Further, the sheet material 30 is configured in two or more layers, and the electrical wire 14 may be fixed by being sandwiched between the two layers of the sheet material 30.

Figure 6:
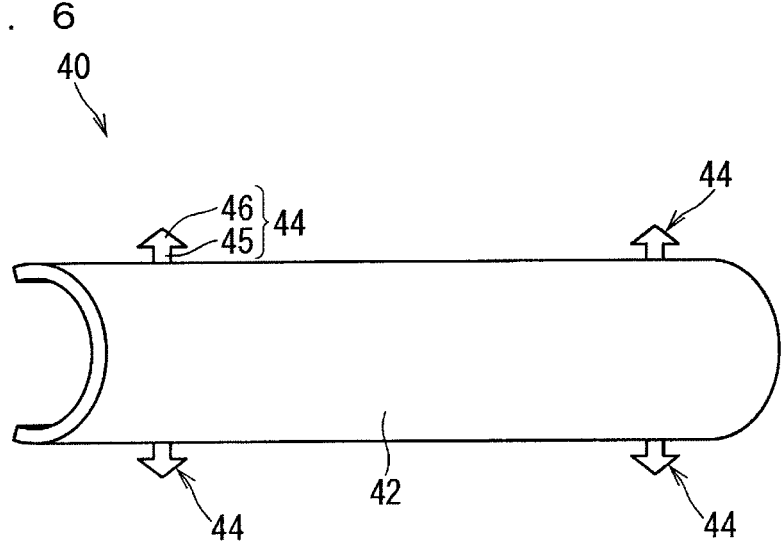
FIG. 6 is a perspective view showing a support member according to the first embodiment.

FIG. 6 is a perspective view showing the support member 40 according to the first embodiment.

The support member 40 is a member for supporting the wire harness 12 on the bar-shaped member 60. The support member 40 includes a fitting portion 42. Further, here, the support member 40 includes a locking projection portion 44 as a support portion. The support member 40 is integrally formed into a shape including the fitting portion 42 and the locking projection portion 44 by, for example, injection molding using resin or the like as a material.

The fitting portion 42 is a portion formed so as to be capable of being fitted to an outer peripheral portion of the bar-shaped member 60. More specifically, the fitting portion 42 is formed in a partially cylindrical shape that is partially opened in a circumferential direction. Here, the fitting portion 42 is formed in a partially cylindrical shape (C-shaped in a cross-sectional view) that is partially opened in the circumferential direction and has an extension dimension larger than half in the circumferential direction. In other words, the fitting portion 42 is formed in a shape having an inner peripheral portion having a radius of curvature similar to that of the outer peripheral portion of the bar-shaped member 60 in an angle range larger than 180 degrees.

An inner peripheral shape of the fitting portion 42 is formed to be the same as or smaller (here, slightly smaller) than an outer peripheral shape of the bar-shaped member 60. Further, the opening portion of the fitting portion 42 is set to be smaller than a diameter of a bar-shaped peripheral member. Further, the fitting portion 42 is formed to be elastically deformable so as to expand the opening portion. More preferably, the fitting portion 42 is preferably set to sandwich the bar-shaped member 60 in a state where the bar-shaped member 60 is provided on an inner side, and have a small inner peripheral shape by which the fitting portion 42 is not removable due to the wire harness 12 or its own weight and is not rotatable around a central axis of the bar-shaped member 60.

When the bar-shaped member 60 is being inserted into an inner side of the fitting portion 42 through the opening portion, the opening portion is elastically deformed and expands, and when the bar-shaped member 60 is disposed on the inner side, the fitting portion 42 becomes in a state of sandwiching the outer peripheral portion of the bar-shaped member 60 by a force of elastically returning to an original shape.

Then, by fitting the fitting portion 42 of the support member-attached wire harness 10 to the outer peripheral portion of the bar-shaped member 60, the wire harness 12 supported by the support member 40 is supported in a form of extending along the bar-shaped member 60. Note that the support member 40 and the support member-attached wire harness 10 may be fitted to the bar-shaped member 60 from a lateral direction or from a vertical direction (or from other directions as a matter of course). That is, the support member 40 and the support member-attached wire harness 10 are preferably fitted from a direction in which the support member 40 and the support member-attached wire harness 10 are easily fitted to the bar-shaped member 60, and maintained at an orientation by which the electrical wire 14 is positioned at a position where space for arranging the wire harness 12 can be secured.

In the support structure of the support member 40 and the wire harness 12, a support portion formed on at least one of the sheet material 30 and the support member 40 is used. The support portion supports the sheet material 30 disposed along the outer periphery of the fitting portion 42 at a fixed position with respect to the fitting portion 42. Specifically, the locking projection portion 44 is formed here as the support portion.

The locking projection portion 44 is formed on the support member 40. The locking projection portion 44 protrudes from the fitting portion 42 toward the outer peripheral side. The locking projection portion 44 is locked in a state of penetrating the sheet material 30. More specifically, the locking projection portion 44 includes a column portion 45 and a locking protrusion 46. The column portion 45 is provided so as to protrude outward from the outer peripheral surface of the fitting portion 42. The locking protrusion 46 is provided at the tip of the column portion 45. The locking protrusion 46 is formed so as to protrude radially outward with respect to the column portion 45. By causing the locking protrusion 46 to penetrate the sheet material 30, the locking protrusion 46 is hooked on the sheet material 30, so that the sheet material 30 is supported by the support member 40. In the example shown in FIG. 6, the locking protrusion 46 is formed in a tapered shape such as a cone shape. However, the configuration is not limited to this. The locking protrusion 46 may be formed in a flat plate shape, such as a disk shape, for example.

Here, as shown in FIG. 4, a hole 32 through which the locking protrusion 46 can be inserted is preferably formed on the sheet material 30 in advance. In this manner, the locking protrusion 46 no longer needs to be caused to penetrate a portion without the hole 32 of the sheet material 30, and the shape of the locking protrusion 46 can be simplified. For example, the hole 32 is considered to be formed in a circular shape or a slit shape.

Such support portions (here, the locking projection portions 44) are provided at a plurality of locations apart from each other in the circumferential direction. In particular, here, the support portion (here, the locking projection portion 44) is provided so as to be capable of supporting both end portions in the circumferential direction of the sheet material 30. In this manner, the circumferential end portion of the sheet material 30 is less likely to flutter. Further, such support portions (here, the locking projection portions 44) are provided at a plurality of locations along a longitudinal direction of the bar-shaped member 60. In particular, here, the support portion (here, the locking projection portion 44) is provided so as to be capable of supporting both ends in the longitudinal direction of the sheet material 30. In this manner, the longitudinal end portion of the sheet material 30 is less likely to flutter. Therefore, here, four corners of the sheet material 30 having a rectangular shape are supported by the support member 40 by the support portions (here, the locking projection portions 44).

At this time, in the example shown in FIG. 2, the locking projection portions 44 are employed as all the four support portions. However, a configuration different from the locking projection portion 44 may be employed as the support portion. Details of the support portion having a configuration different from that of the locking projection portion 44 will be described later.

According to the above aspect, the wire harness 12 disposed along the outer periphery of the fitting portion 42 can be supported at a fixed position with respect to the fitting portion 42 by the support portion (here, the locking projection portion 44). Further, for example, the support member 40 can be caused to be supported by the bar-shaped member 60 in a state where the sheet material 30 in the wire harness 12 is supported at a fixed position with respect to the support member 40. For these reasons, the wire harness 12 is suitably supported on the bar-shaped member 60 in a flat manner (specifically, in a manner that the undulation is reduced with respect to the outer periphery of the bar-shaped member 60).

At this time, here, since the electrical wire 14 is fixed to the sheet material 30 and the sheet material 30 is fixed to the support member 40, the electrical wire 14 is supported at a fixed position with respect to the support member 40 and hardly moves. In particular, the electrical wire 14 is held so as not to move with respect to the fitting portion 42. In this manner, the occurrence of vibration and rubbing of the electrical wire 14 can be suppressed. Furthermore, the electrical wire 14 is easily maintained in a state of spreading along the outer periphery of the fitting portion 42, so that the electrical wire 14 is easily maintained in a state of spreading along the outer periphery of the bar-shaped member 60 even in a region adjacent to the support member 40 along the longitudinal direction of the bar-shaped member 60 in a state where the support member-attached wire harness 10 is supported by the bar-shaped member 60.

Further, the sheet material 30 can be easily supported by the support member 40 by the locking projection portion 44. Further, the sheet material 30 is easily supported at a fixed position with respect to the support member 40.

Further, since the electrical wire 14 is fixed to the sheet material 30 by sewing or welding, the flat wire harness 12 (112) can be easily obtained.

Second Embodiment

Figure 7:
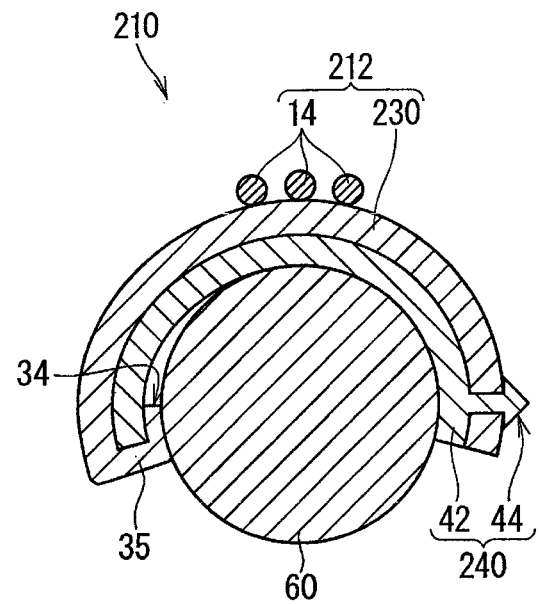
FIG. 7 is a cross-sectional view showing a support member-attached wire harness and a support structure, of the support member-attached wire harness according to a second embodiment.
Figure 8:
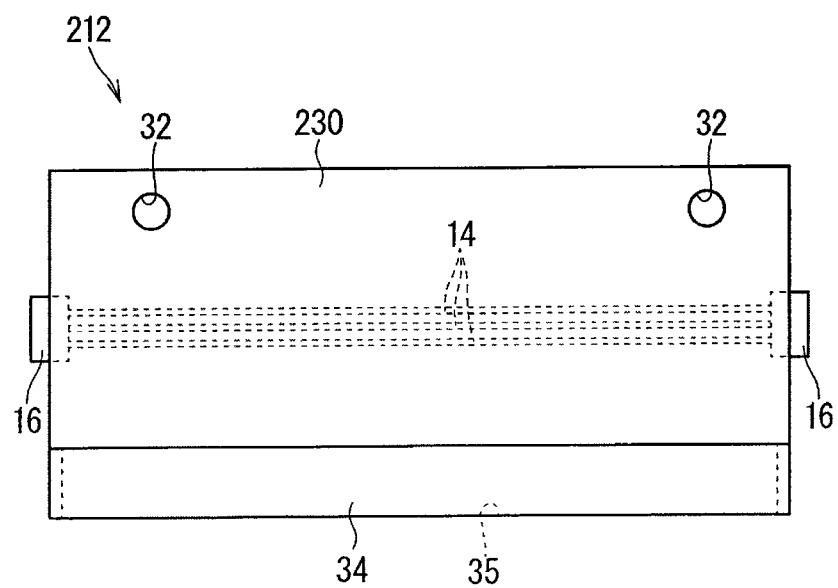
FIG. 8 is a bottom view showing a wire harness according to the second embodiment.

Next, a support member-attached wire harness and a support structure of the support member-attached wire harness according to a second embodiment will be described. FIG. 7 is a cross-sectional view showing a support member-attached wire harness 210 and a support structure of the support member-attached wire harness 210 according to the second embodiment. FIG. 8 is a bottom view showing a wire harness 212 according to the second embodiment. Note that, in the description of the present embodiment, the same constituents as those described above are denoted by the same reference numerals, and will be omitted from the description.

In the support member-attached wire harness 210 according to the second embodiment, the configuration of part of the support portions is different from the configuration of the support portion in the support member-attached wire harness 10 according to the first embodiment, that is, the locking projection portion 44.

Here, the locking projection portion 44 is provided on a support member 240 as two support portions located on one end side in the circumferential direction among the four support portions. Further, a recess 34 is provided on a sheet material 230 as two support portions located on the other end side in the circumferential direction among the four support portions.

The recess 34 is formed on the inner peripheral side of the sheet material 230. The recess 34 is formed such that an end portion (here, a circumferential end portion) of the fitting portion 42 can be inserted into the recess 34. At this time, the recess 34 is formed in a bag shape, that is, a shape having a bottom 35.

The recess 34 is formed, for example, as described below. That is, first, a circumferential end portion of the sheet material 230 is folded back. Then, an edge portion of a portion where the folded portion and an original portion overlap is fixed. In this manner, as shown in FIG. 7, the recess 34 is formed in a bottomed bag shape. However, the formation method of the recess 34 is not limited to the one described above. For example, the recess 34 may be formed in such a manner that a sheet piece different from the sheet material 230 to which the electrical wire 14 is fixed is prepared, and, after the sheet piece is placed on top of the sheet material 230, three edge portions of the sheet piece are fixed to the sheet material 30. Note that, a fixing method of the edge portion may be sewing, welding, or sticking using an adhesive, a double-sided tape or the like.

Then, the locking projection portion 44 of the support member 240 is inserted through the hole 32 of the sheet material 230 so that one end portion in the circumferential direction of the sheet material 230 is supported by the support member 240, and an edge portion of the fitting portion 42 on the side (the other end side) on which the locking projection portion 44 is not provided of the support member 240 is inserted into the recess 34, so that the other end portion in the circumferential direction of the sheet material 230 is supported by the support member 240. In this manner, four corners of the sheet material 230 are supported by the support member 240.

However, the recess 34 may have a cylindrical shape without the bottom 35. Such a recess is formed, for example, by forming a slit in a portion that contacts the bottom 35 of the bag after being formed into a bottomed bag shape by the method involving folding. Further, the recess is formed in a manner that, for example, when the sheet piece is placed on top of the sheet material 230 and the edge portion is fixed, only two edge portions that are portions extending along the circumferential direction are fixed.

When the recess 34 has a bottom, the tip of the fitting portion 42 of the support member 240 reaches the bottom 35 of the recess 34, so that the sheet material 230 can be suppressed from further shifting in the circumferential direction with respect to the support member 240. On the other hand, when the recess 34 has a shape without the bottom 35, a plurality of types of the support members 240 which are different in the length of the fitting portion 42 can be handled with dimensions of one type of the sheet material 230.

Note that, although the recess 34 has been described to be formed so that the circumferential end portion of the fitting portion 42 of the support member 240 can be inserted into the recess 34, this configuration is not essential. The recess 34 may be formed such that a longitudinal end portion of the support member 240 can be inserted into the recess 34. In this case, the recess is provided at the longitudinal end portion of the sheet material.

According to the present aspect, the sheet material 230 can be easily supported by the support member 240 by inserting the fitting portion 42 into the recess 34. In particular, the sheet material 230 can be easily supported at a fixed position with respect to the support member 240 by the recess 34 having a bag shape.

Here, when the support member-attached wire harness 210 according to the present embodiment is supported by the bar-shaped member 60, a portion constituting the recess 34 in the sheet material 230 (here, the folded portion of the sheet material 230) is sandwiched between the support member 240 and the bar-shaped member 60 as shown in FIG. 7. In this manner, the circumferential end portion of the sheet material 230 is less likely to flutter.

Third Embodiment

Figure 9:
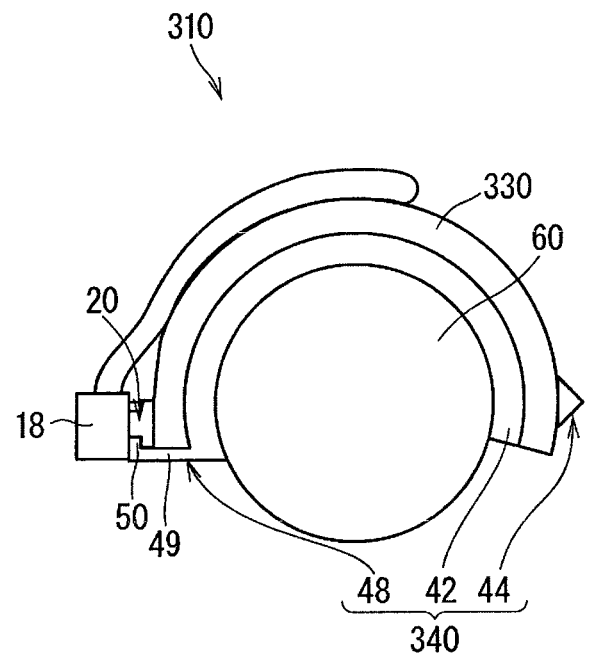
FIG. 9 is a front view showing a support member-attached wire harness and a support structure of the support member-attached wire harness according to a third embodiment.
Figure 10:
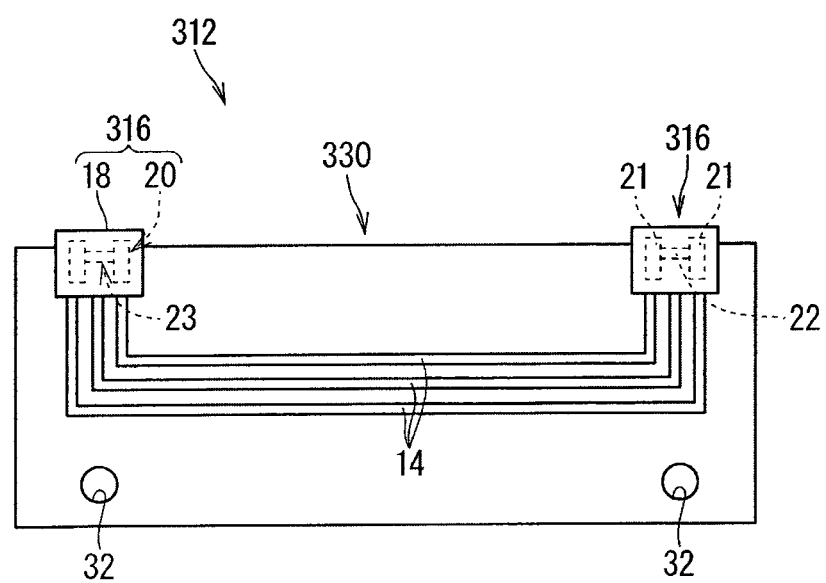
FIG. 10 is a plan view showing a wire harness according to the third embodiment.
Figure 11:
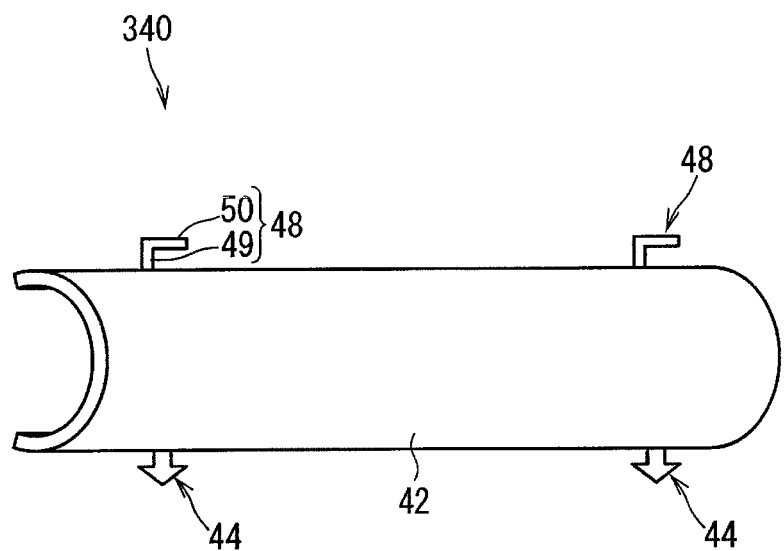
FIG. 11 is a perspective view showing a support member according to the third embodiment.

Next, a support member-attached wire harness and a support structure of the support member-attached wire harness according to a third embodiment will be described. FIG. 9 is a front view showing a support member-attached wire harness 310 and a support structure of the support member-attached wire harness 310 according to the third embodiment. FIG. 10 is a plan view showing a wire harness 312 according to the third embodiment. FIG. 11 is a perspective view showing a support member 340 according to the third embodiment. Note that, in the description of the present embodiment, the same constituents as those described above are denoted by the same reference numerals, and will be omitted from the description.

In the support member-attached wire harness 310 according to the third embodiment, the configuration of part of the support portions is different from the configuration of the support portion in the support member-attached wire harness 10 according to the first embodiment, that is, the locking projection portion 44.

Here, the locking projection portion 44 is provided on the support member 340 as two support portions located on one end side in the circumferential direction among the four support portions. Further, a connector locking portion 48 is provided on the support member 340 as two support portions located on the other end side in the circumferential direction among the four support portions.

More specifically, in the wire harness 312, a connector 316 is located at an end portion (here, a circumferential end portion) of a sheet material 330. Then, the connector locking portion 48 protrudes from the fitting portion 42 toward the outer peripheral side. The connector 316 is locked in the connector locking portion 48. As a locking structure of the connector 316, a structure in which a locking piece 50 is locked in a locking recess 23 provided in an outer peripheral portion of the main body portion 18 of the connector 316 can be employed. This structure is also referred to as what is called a cassette structure. Note that, in the example shown in FIG. 9, the locking piece 50 is inserted into the locking recess 23 from the direction opposite to the direction where the electrical wire 14 is inserted into the cavity 19. However, the locking piece 50 may be inserted from the direction where the electrical wire 14 is inserted into the cavity 19.

More specifically, as shown in FIG. 10, a cassette portion 20 formed in an H shape protrudes from the outer peripheral portion of the main body portion 18 of the connector 316. Two parallel protruding pieces 21 of the H-shaped cassette portion 20 extend so as to protrude from the main body portion 18 of the connector 316, and a connecting piece 22 connecting the two protruding pieces 21 is formed at a position floating from the main body portion 18. Therefore, a portion between the two protruding pieces 21 in the cassette portion 20 and between the main body portion 18 and the connecting piece 22 functions as the locking recess 23. Further, the connector locking portion 48 includes a base end portion 49 that protrudes from an end edge portion (here, a circumferential end edge portion) of the fitting portion 42, and the locking piece 50 that protrudes in a direction crossing the base end portion 49.

Here, when the connector 316 is locked at the connector locking portion 48, as shown in FIG. 9, the end portion (here, the circumferential end portion) of the sheet material 330 is sandwiched between the connector 316 and the fitting portion 42. In this manner, the circumferential end portion of the sheet material 330 is less likely to flutter. For example, by making a length dimension of the base end portion 49 in the connector locking portion 48 shorter than the sum of a thickness dimension of the sheet material 330 and a thickness dimension of the connecting piece 22 in the connector locking portion 48, the end portion of the sheet material 330 is sandwiched between the connector 316 and the fitting portion 42. However, there may be a case where the end portion of the sheet material 330 is not sandwiched between the connector 316 and the fitting portion 42.

Note that, although the connector locking portion 48 has been described to be provided in the circumferential end portion of the support member 340, this configuration is not essential. The connector locking portion 48 may be provided in a longitudinal end portion of the support member 340.

According to the present aspect, the support member 340 can support the sheet material 330 easily by locking the connector 316 to the connector locking portion 48. Furthermore, since the end portion of the sheet material 330 is sandwiched between the connector 316 and the fitting portion 42, the end portion of the sheet material 330 is less likely to flutter.

Fourth Embodiment

Figure 12:
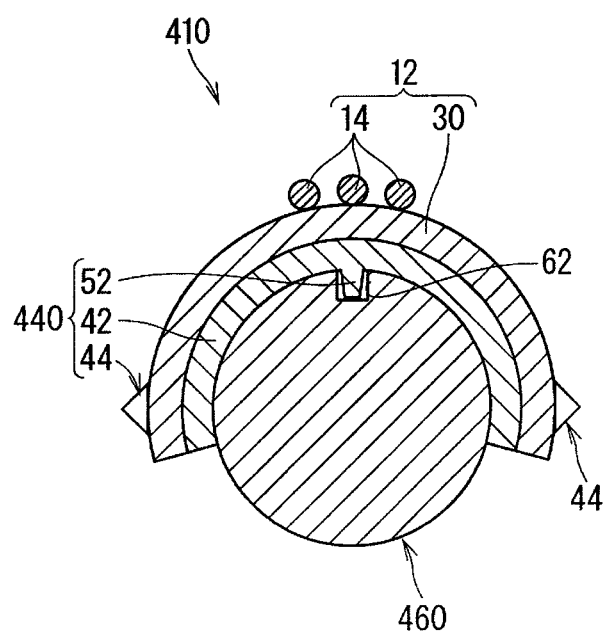
FIG. 12 is a cross-sectional view showing a support member-attached wire harness and a support structure of the support member-attached wire harness according to a fourth embodiment.
Figure 13:
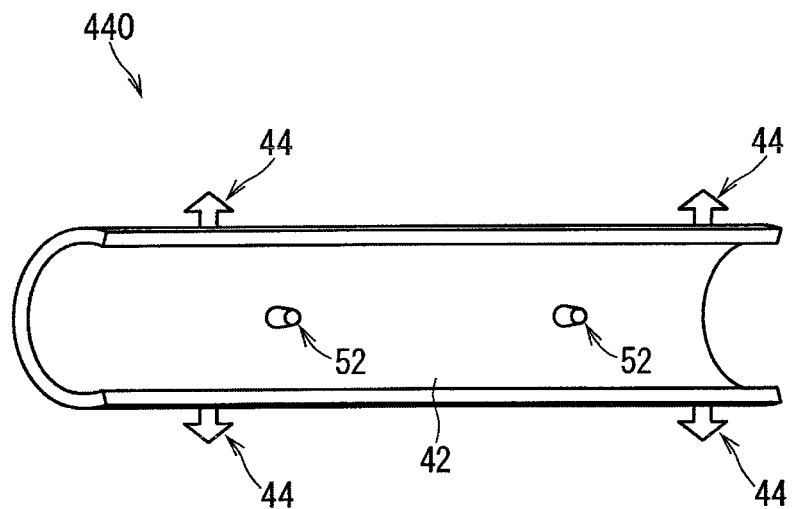
FIG. 13 is a perspective view showing a support member according to the fourth embodiment.
Figure 14:
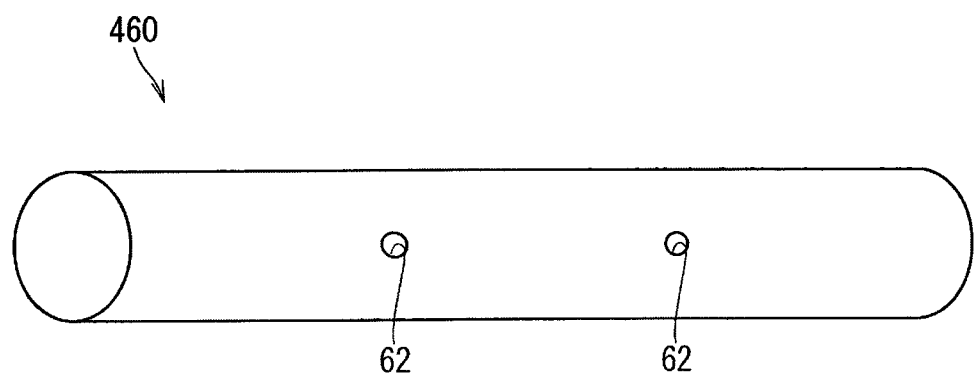
FIG. 14 is a perspective view showing a bar-shaped member according to the fourth embodiment.

Next, a support member-attached wire harness and a support structure of the support member-attached wire harness according to a fourth embodiment will be described. FIG. 12 is a cross-sectional view showing a support member-attached wire harness 410 and a support structure of the support member-attached wire harness 410 according to the fourth embodiment. FIG. 13 is a perspective view showing a support member 440 according to the fourth embodiment. FIG. 14 is a perspective view showing a bar-shaped member 460 according to the fourth embodiment. Note that, in the description of the present embodiment, the same constituents as those described above are denoted by the same reference numerals, and will be omitted from the description.

Here, the support member-attached wire harness 410 is supported while being positioned at a fixed position with respect to the bar-shaped member 460 by a positioning projection portion 52 provided on the support member 440.

More specifically, the positioning projection portion 52 is provided so as to protrude from the fitting portion 42 toward the inner peripheral side. Then, in a manner corresponding to the positioning projection portion 52, a hole 62 that can accommodate the positioning projection portion 52 is formed on the bar-shaped member 460. Note that, in a case where the bar-shaped member 460 is cylindrical, the hole 62 may be a through-hole.

Here, the hole 62 is formed to be larger than the positioning projection portion 52, and the positioning projection portion 52 and the hole 62 are formed so as not to be locked. For this reason, the positioning projection portion 52 is easily stored in the hole 62. The positioning projection portion 52 and the hole 62 may be locked together, and, for example, the positioning projection portion 52 may be press-fitted into the hole 62.

In the example shown in FIG. 12, the positioning projection portion 52 is formed in a truncated cone shape, and the hole 62 is formed in a cylindrical shape. At least one of the configuration in which the positioning projection portion 52 is formed in a tapered shape as described above and a configuration in which the hole 62 is formed in a shape that gradually expands toward the opening is preferably included. In this manner, the positioning projection portion 52 can be easily stored in the hole 62.

Here, the positioning projection portion 52 is provided on the inner peripheral surface in the vicinity of a circumferential central portion of the fitting portion 42. The positioning projection portion 52 may be provided on the inner peripheral surface on a circumferential end portion side of the fitting portion 42. In particular, the positioning projection portion 52 may be provided at the same position as the support portion (here, the locking projection portion 44) along the circumferential direction.

Further, a plurality of the positioning projection portions 52 are provided at intervals in the longitudinal direction. In this manner, a positioning state can be maintained more reliably. In particular, the positioning state is stabilized also when, for example, the fitting portion 42 on the end portion side without the positioning projection is put on the bar-shaped member 460 after the positioning projection portion 52 is stored in the hole 62 of the bar-shaped member 460. Note that the positioning projection portion 52, which is provided at a position different from the support portion (here, the locking projection portion 44) along the longitudinal direction, may be provided at the same position as the support portion (here, the locking projection portion 44).

According to the present aspect, when the support member 440 is attached to the bar-shaped member 460, the support member 440 and the bar-shaped member 460 can be easily positioned using the positioning projection portion 52. Further, since the positioning projection portion 52 is stored in the hole 62 after the support member 440 is attached to the bar-shaped member 460, the support member 440 is less likely to be displaced in the longitudinal direction and the circumferential direction with respect to the bar-shaped member 460, and the positioning state is easily maintained.

{Variation of First to Fourth Embodiments}

Figure 15:
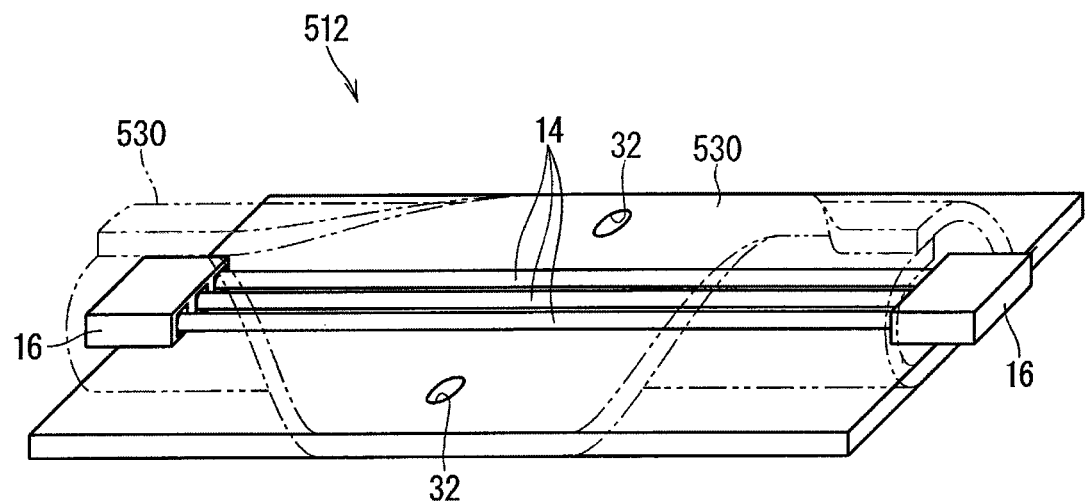
FIG. 15 is an explanatory view showing a variation of the wire harness.

FIG. 15 is an explanatory view showing a variation of the wire harness 12.

Although the entire portion fixed to the sheet material 30 of the wire harnesses 12 has been described to be in a flat state, this configuration is not essential. As shown in FIG. 15, part of a sheet material 530 is also considered to be rounded in a wire harness 512. In this case, a rounded portion of the sheet material 530 is more easily bent and deformed than the flat portion, and the wire harness 512 is easily bent and disposed. Further, in this case, a portion of the wire harness 512 where the sheet material 530 is flat is preferably supported by the support portion.

Figure 16:
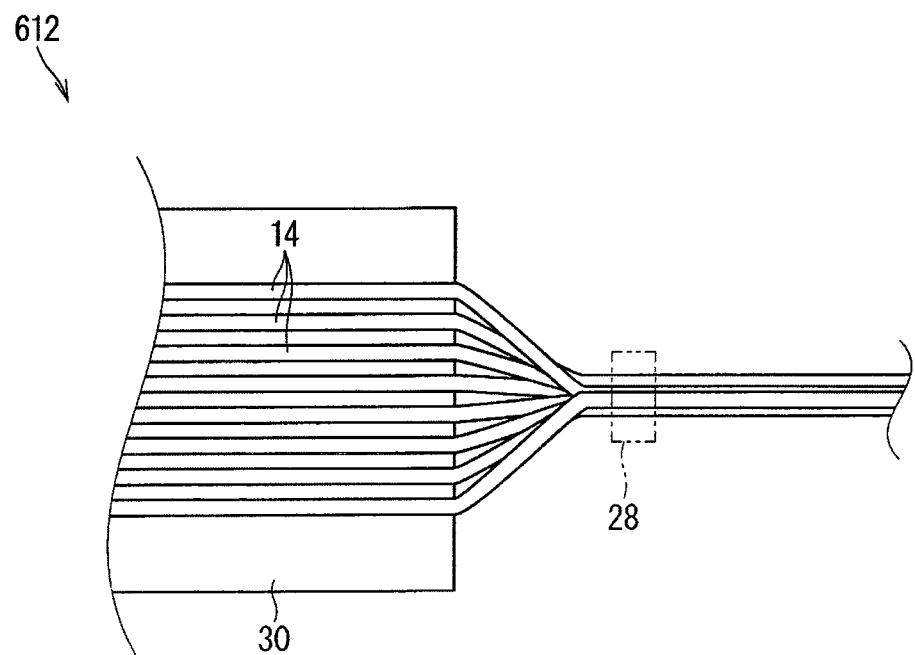
FIG. 16 is an explanatory view showing another variation of the wire harness.

FIG. 16 is an explanatory view showing another variation of the wire harness 12.

Although the entire electrical wire 14 has been described to be fixed to the sheet material 30, this is not an essential configuration. As shown in FIG. 16, in a wire harness 612, a portion of the electrical wire 14 that is not fixed to the sheet material 30 can be considered to exist. If part of the electrical wire 14 is not fixed to the sheet material 30 as described above, the electrical wire 14 is easily bent and deformed at the non-fixed portion. In this case, the portion of the electrical wire 14 that is not fixed to the sheet material 30 can be considered to be bundled as shown in FIG. 16. In this manner, the electrical wire 14 can be further easily bent and deformed. Note that the portion where the plurality of electrical wires 14 are bundled is preferably bundled by a bundling member 28. As the bundling member 28, an adhesive tape, a binding band, or the like can be used.

Figure 17:
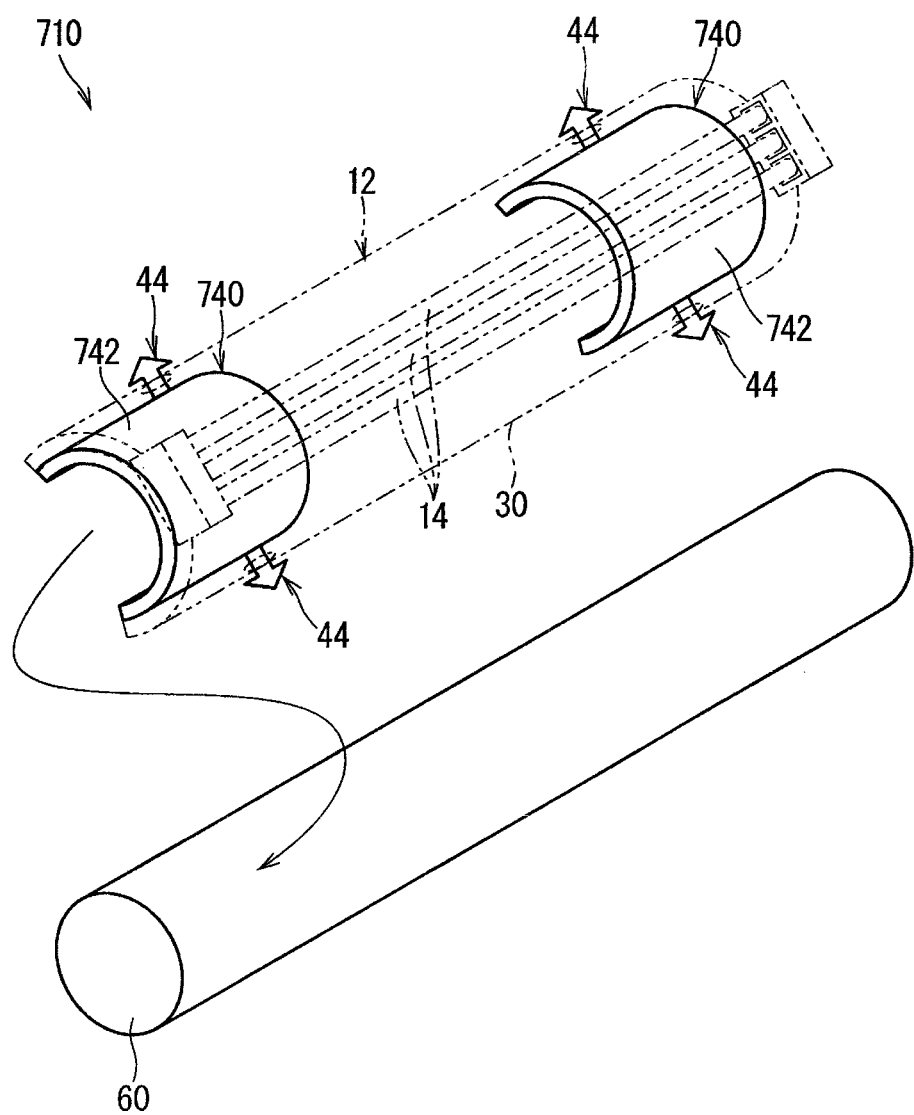
FIG. 17 is an explanatory view showing a variation of the support member-attached wire harness.

FIG. 17 is an explanatory view showing a variation of the support member-attached wire harness 10.

Although the fitting portion 42 in the support member 40 has been described to exist over the entire longitudinal direction of the sheet material 30, this is not an essential configuration. As shown in FIG. 17, in a support member-attached wire harness 710, a fitting portion 742 in a support member 740 may exist only in a partial region along the longitudinal direction of the sheet material 30. In the example shown in FIG. 17, two of the support members 740 each having the fitting portion 742 formed to be shorter than the sheet material 30 are positioned at both ends along the longitudinal direction of the sheet material 30. Therefore, the support member 740 is not interposed in a longitudinal middle portion of the sheet material 30. In this case, the sheet material 30 can be considered to be directly wound around the bar-shaped member 60.

Further, although four corners of the sheet material 30 having a rectangular shape has been described to be supported by the support portion, this configuration is not essential. There may be a case where one corner, two corners, or three corners of the sheet material 30 having a rectangular shape are supported by the support portion. In this case, an end portion of the sheet material 30 that is not supported by the support portion is preferably sandwiched between the bar-shaped member 60 and the fitting portion 42, for example.

Note that the variations described above are also applicable to a support member-attached wire harness and a support structure of the support member-attached wire harness according to fifth to seventh embodiments described below.

Fifth Embodiment

Figure 18:
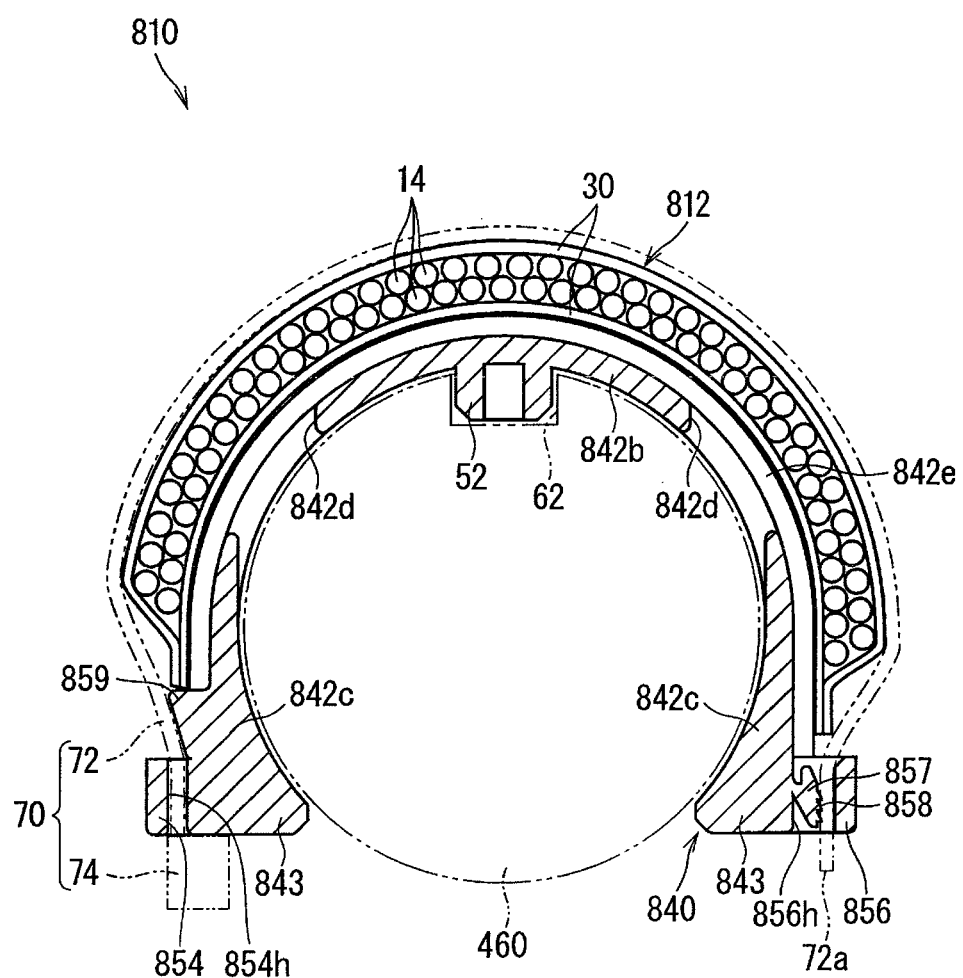
FIG. 18 is a cross-sectional view showing a support member-attached wire harness and a support structure of the support member-attached wire harness according to a fifth embodiment.
Figure 19:
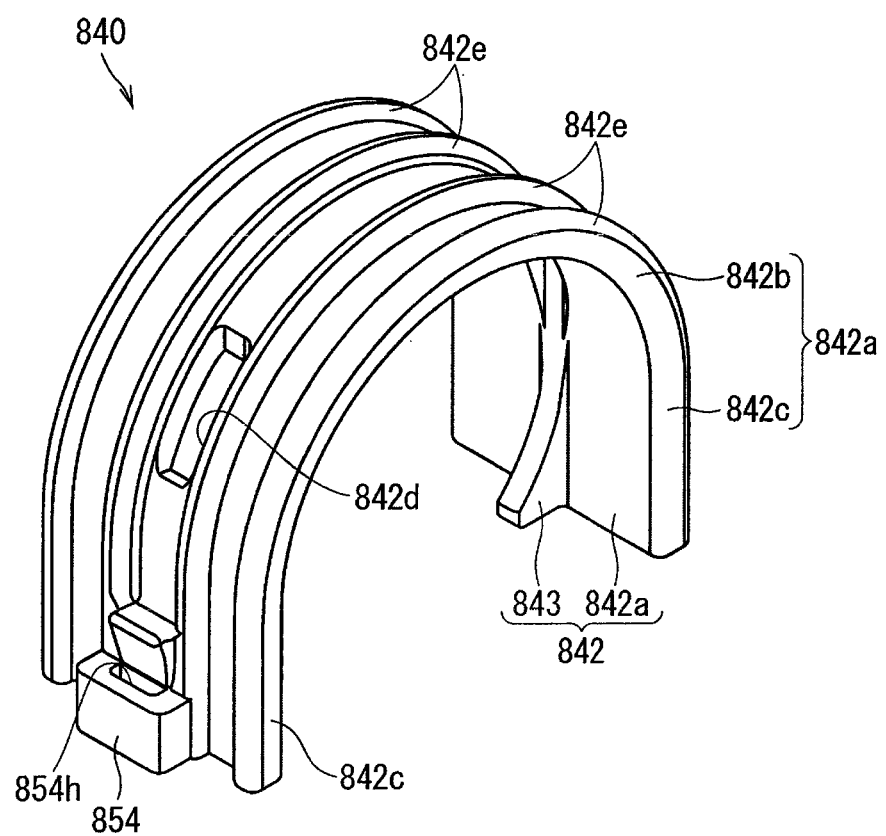
FIG. 19 is a perspective view showing a support member according to the fifth embodiment.
Figure 20:
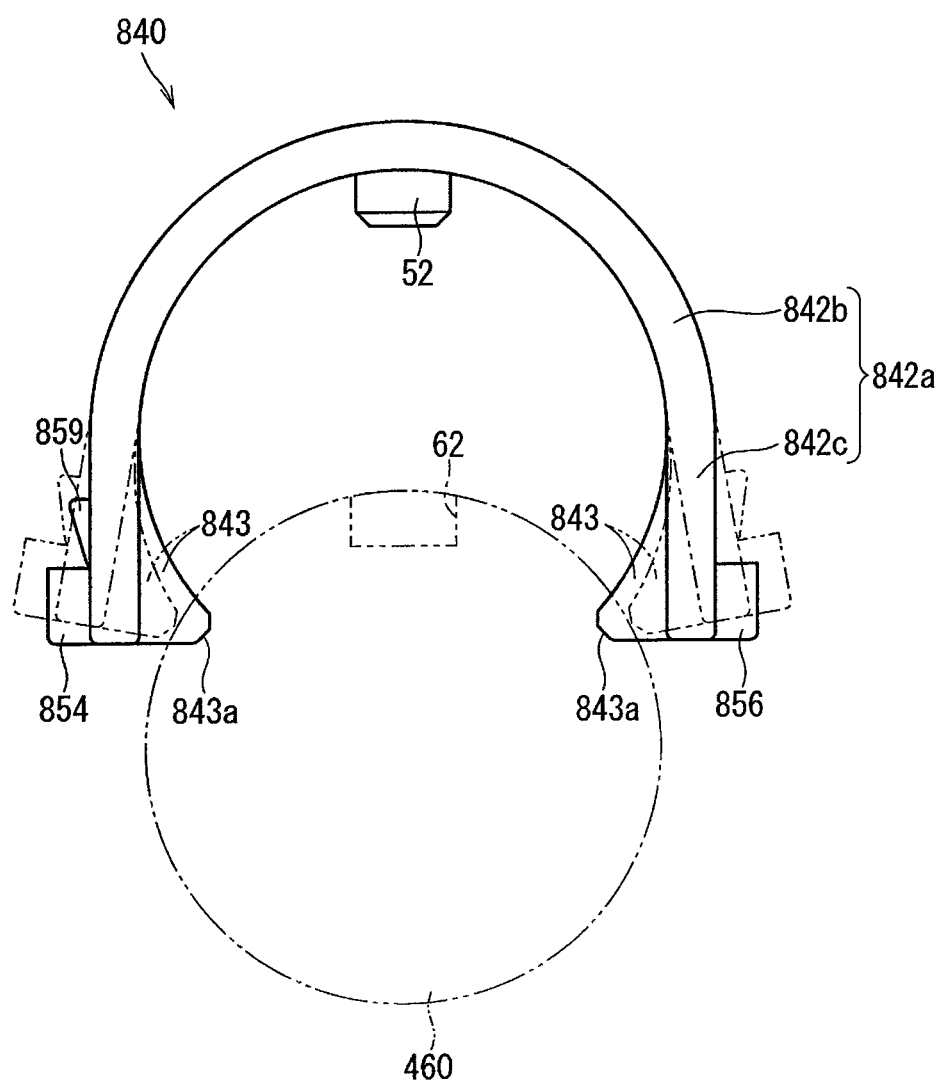
FIG. 20 is a front view showing the support member according to the fifth embodiment.
Figure 21:
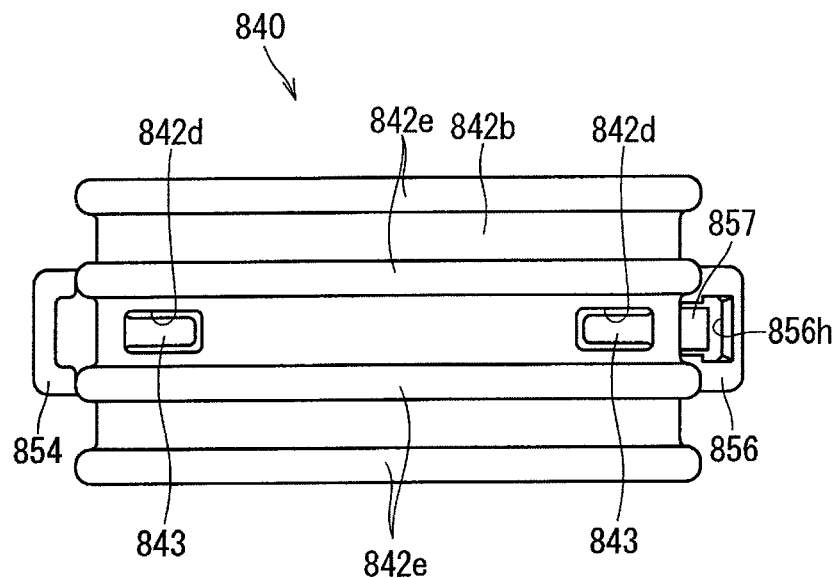
FIG. 21 is a plan view showing the support member according to the fifth embodiment.
Figure 22:
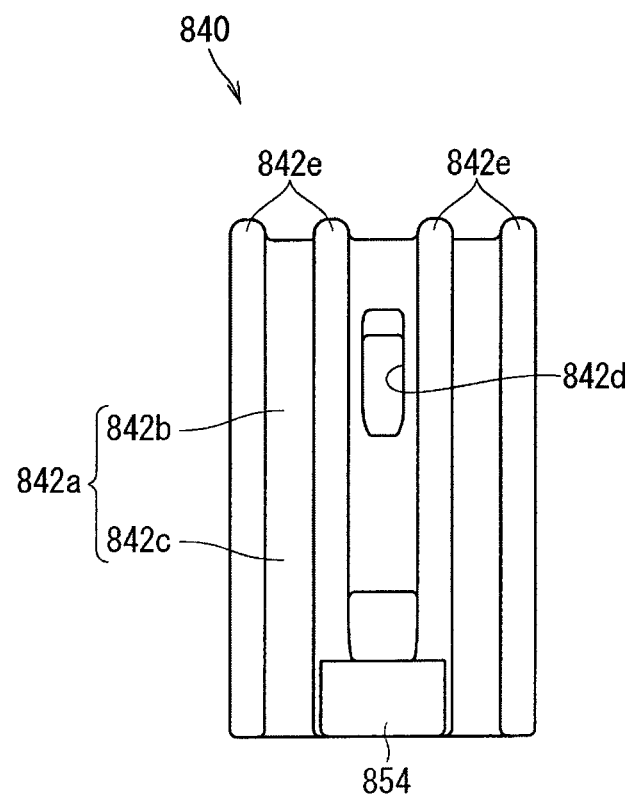
FIG. 22 is a side view showing the support member according to the fifth embodiment.
Figure 23:
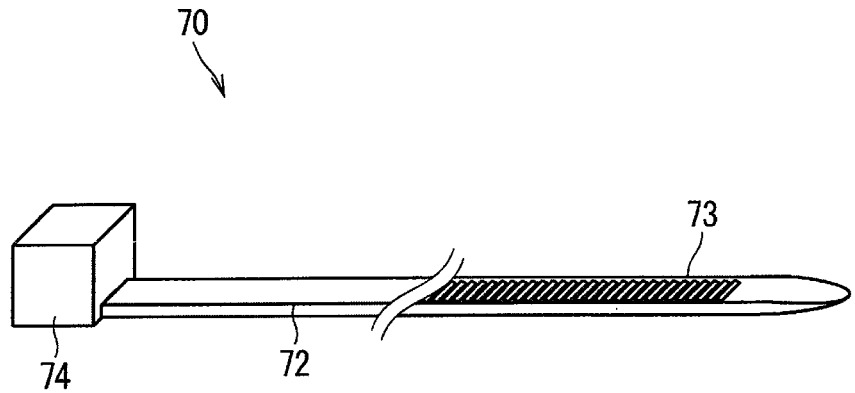
FIG. 23 is a perspective view showing a band component used for the support member-attached wire harness according to the fifth embodiment.
Figure 24:
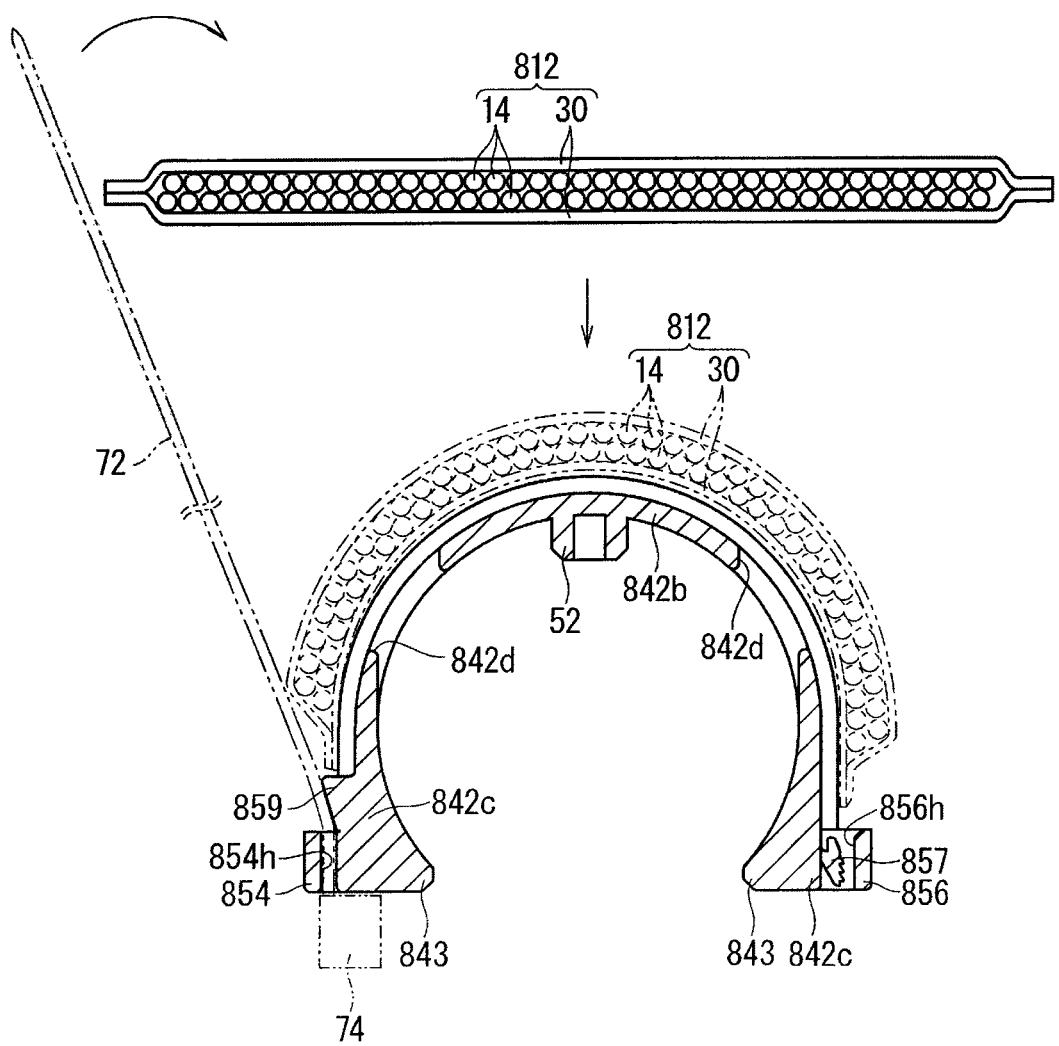
FIG. 24 is an explanatory view showing a state of manufacturing the support member-attached wire harness according to the fifth embodiment.

Next, a support member-attached wire harness and a support structure of the support member-attached wire harness according to a fifth embodiment will be described. FIG. 18 is a cross-sectional view showing a support member-attached wire harness 810 and a support structure of the support member-attached wire harness 810 according to the fifth embodiment. FIG. 19 is a perspective view showing a support member 840 according to the fifth embodiment. FIG. 20 is a front view showing the support member 840 according to the fifth embodiment. In FIG. 20, an imaginary line indicates a state in which the support member 840 is elastically deformed when attached to the bar-shaped member 460. FIG. 21 is a plan view showing the support member 840 according to the fifth embodiment. FIG. 22 is a side view showing the support member 840 according to the fifth embodiment. FIG. 23 is a perspective view showing a band component 70 used for the support member-attached wire harness 810 according to the fifth embodiment. FIG. 24 is an explanatory view showing a state of manufacturing the support member-attached wire harness 810 according to the fifth embodiment. Note that, in the description of the present embodiment, the same constituents as those described above are denoted by the same reference numerals, and will be omitted from the description.

Here, the band component 70 is used and a wire harness 812 is supported by the support member 840. Therefore, the support member-attached wire harness 810 and the support structure of the support member-attached wire harness 810 according to the fifth embodiment further include the band component 70. Further, here, the shapes of the wire harness 812 and the support member 840 are also changed from the shapes of the wire harness and the support member described so far. Note that the bar-shaped member 460 is the same as the bar-shaped member 460 shown in FIG. 13. Therefore, the hole 62 is formed in the bar-shaped member 460 here as well. Further, the positional relationship between the support member 840, the wire harness 812, and the bar-shaped member 460 is the same as the positional relationship between the support member 740, the wire harness 12, and the bar-shaped member 60 in the above-described support member-attached wire harness 710.

When the wire harness 812 is viewed, the electrical wire 14 is sandwiched between two of the sheet materials 30, and is formed flat as a whole. At this time, the electrical wire 14 is not fixed to the sheet material 30. Accordingly, the electrical wire 14 is sandwiched between two of the sheet materials 30, and the wire harness 812 is sandwiched between the support member 840 and the band component 70, so that the electrical wire 14 is maintained in a flat state. However, the electrical wire 14 may be fixed to the sheet material 30. Further, in the example shown in FIG. 18, the electrical wires 14 are arranged in two stages. However, this is not an essential configuration. The electrical wires 14 may be arranged in one stage, or may be arranged in three or more stages.

Two of the sheet materials 30 are fixed directly or indirectly. Here, both side edge portions of two of the sheet materials 30 are directly fixed. In this manner, the electrical wire 14 is surrounded by two of the sheet materials 30. Such fixing means is not particularly limited, and various fixing means can be used. Specific examples of the fixing means include bonding with an adhesive, a double-sided adhesive tape, and the like, welding, mechanical fixing with a retaining member, such as a clip, and the like. Note that, as a case where two of the sheet materials 30 are indirectly fixed, for example, a case where the electrical wires 14 are fixed to two of the sheet materials 30 and the electrical wires 14 are fixed to each other can be considered.

A fitting portion 842 of the support member 840 includes a main body portion 842a and a fitting piece 843.

The main body portion 842a is formed in a semi-elliptical cylindrical shape in which a cylinder having a cross section of an elliptical shape is divided in half. Specifically, the main body portion 842a includes a semi-cylindrical portion 842b that can cover a half circumference of the bar-shaped member 460, and an extending portion 842c that extends straight from both end portions of the semi-cylindrical portion 842b in a tangential direction. In the example shown in FIG. 18, an extension dimension of the extending portion 842c is set to be smaller than the radius of curvature of the semi-cylindrical portion 842b. Therefore, protrusion of the extending portion 842c beyond the bar-shaped member 460 is suppressed in a state where the bar-shaped member 460 is stored in the semi-cylindrical portion 842b. The extension dimension of the extending portion 842c may be set to be the same as or larger than the radius of curvature of the semi-cylindrical portion 842b.

The fitting pieces 843 are formed on, inner surfaces of two of the extending portions 842c. An inner surface of each of the fitting pieces 843 is formed in a curved surface shape. Here, the inner surface of each of the fitting pieces 843 is formed to have the same radius of curvature as that of the semi-cylindrical portion 842b. Further, here, each of the fitting pieces 843 is formed to have dimensions that allow the fitting piece 843 to cover one eighth circumference of the bar-shaped member 460. However, the region where each of the fitting pieces 843 covers the bar-shaped member 460 is not limited to this. Each of the fitting pieces 843 may cover a region larger than one eighth circumference of the bar-shaped member 460, or may cover a region smaller than one eighth circumference, as long as the fitting piece 843 can be fitted to the bar-shaped member 460 together with the semi-cylindrical portion 842b.

Here, space between the tips of the fitting pieces 843 is an opening portion of the fitting portion 842, and the bar-shaped member 460 can be inserted into the inner peripheral side of the support member 840 through the opening portion. More specifically, in the support member 840, dimensions of the opening portion are set to be smaller than the diameter of the bar-shaped member 460. Then, the support member 840 can be elastically deformed so that the dimensions of the opening portion are equal to the diameter of the bar-shaped member 460. Further, the outer surface side of the tip of each of the fitting pieces 843 is a guide surface 843a formed in a tapered shape. When the bar-shaped member 460 is inserted into the inner peripheral side of the support member 840 through the opening portion, the bar-shaped member 460 abuts on the guide surface 843a, so that the support member 840 is guided so as to be elastically deformed in the direction of widening the opening portion as shown by an imaginary line in FIG. 20.

Here, description will be made by assuming that the support member 840 is an integrally molded product using a mold. At this time, when the fitting piece 843 is provided on an inner surface of the extending portion 842c, a through-hole 842d for removing the mold is formed on the main body portion 842a. The through-hole 842d is provided in the semi-cylindrical portion 842b at a position overlapping the fitting piece 843 when viewed from the extending direction of the extending portion 842c (in the plan view shown in FIG. 21). At this time, the dimensions of the fitting piece 843 along the axial direction are formed to be smaller than the dimensions of the main body portion 842a along the axial direction, and the fitting piece 843 is formed at the center of the extending portion 842c along the axial direction, so that lowering in rigidity of the support member 840 due to the formation of the through-hole 842d is suppressed.

Furthermore, here, a rib 842e extending in the circumferential direction is formed on an outer surface of the main body portion 842a. A plurality (four in this case) of the ribs 842e are provided at intervals along the axial direction of the main body portion 842a. By providing the rib 842e, the rigidity of the support member 840 is enhanced. Note that the number, shape, dimensions, interval, and the like of the ribs 842e are preferably set as appropriate.

Further, the support member 840 is provided with a support portion. The support portion includes a first locking portion and a second locking portion that are formed on both end sides in the circumferential direction of the support member 840 so that the band component 70 can be locked. The example shown in FIG. 18 is an example in which a first insertion portion 854 and a second insertion portion 856 through which the band component 70 can be inserted and locked are formed as the first locking portion and the second locking portion, respectively. Note that the first locking portion and the second locking portion include a configuration in which the band component can be locked without being inserted, for example, a configuration in which the first locking portion and the second locking portion are a protrusion and the like that lock the band component by penetrating through a plurality of holes formed along the longitudinal direction of the band component.

The first insertion portion 854 is formed such that a band portion 72 described later in the band component 70 can be inserted and a regulation portion 74 described later in the band component 70 cannot be inserted. Specifically, the first insertion portion 854 is provided on the outer surface on one end side in the circumferential direction of the main body portion 842a. On the first insertion portion 854, a first insertion hole 854h having a cross section that is the same as or larger (here, slightly larger) than the band portion 72 is, formed. The first insertion hole 854h is formed so as to extend along the extending direction of the extending portion 842c.

A band lock portion 857 is formed in the second insertion portion 856. The band lock portion 857 can be locked at an uneven portion 73 described later of the band portion 72 so that the band portion 72 can be inserted in one direction and cannot be inserted in the other direction. Specifically, the second insertion portion 856 is provided on the outer surface on the other end side in the circumferential direction of the main body portion 842a. On the second insertion portion 856, a second insertion hole 856h having a cross section larger than the band portion 72 and the first insertion hole 854h is formed. The second insertion hole 856h is formed so as to extend along the extending direction of the extending portion 842c. Then, the band lock portion 857 is formed so as to protrude from the inner peripheral surface of the second insertion hole 856h toward the inside of the second insertion hole 856h. Here, the lock structure of the band lock portion 857 and the band portion 72 will be described in detail later.

Here, the first insertion hole 854h of the first insertion portion 854 and the second insertion hole 856h of the second insertion portion 856 are provided between two of the ribs 842e at the center among the four ribs 842e. Furthermore, a distance between the two ribs 842e at the center is formed to be equal to or larger than a width dimension of the band portion 72. In this manner, the band portion 72 can be disposed between the two ribs 842e at the center.

The band component 70 is locked while being inserted into the first insertion portion 854 and the second insertion portion 856 with the wire harness 812 sandwiched between the band component 70 and the outer peripheral surface of the support member 840. The band component 70 includes the band portion 72 and the regulation portion 74 provided at the base end of the band portion 72.

The band portion 72 is formed in a band shape. On the band portion 72, the uneven portion 73 at which the band lock portion 857 can be locked is formed. Here, the uneven portion 73 is formed on one main surface of the band portion 72. In a state where the band portion 72 is inserted through the first insertion portion 854 and the second insertion portion 856, the uneven portion 73 is locked at the band lock portion 857 in the second insertion portion 856.

Here, the uneven portion 73 of the band portion 72 and the band lock portion 857 are locked as described below.

That is, here, an uneven portion 858 is also formed on a surface abutting on the uneven portion 73 formed on the band portion 72 on the band lock portion 857. Here, for example, at least one of the uneven portion 858 of the band lock portion 857 and the uneven portion 73 of the band portion 72 (here, the uneven portion 858 of the band lock portion 857) includes a perpendicular surface perpendicular to an insertion direction and an inclined surface inclined with respect to the insertion direction. Then, when the band portion 72 is inserted into the second insertion portion 856, abutting of the inclined surface allows further insertion, and when the band portion 72 is about to be removed from the second insertion portion 856, prevention of the removal is achieved by abutting of the perpendicular surface. In this manner, the band lock portion 857 can be locked at the uneven portion 73 of the band portion 72 so that the band portion 72 can be inserted in one direction and cannot be inserted in the other direction.

At this time, the uneven portion 858 of the band lock portion 857 can be selectively locked at the uneven portion 73 of the band portion 72. In this manner, the band lock portion 857 can be locked at a desired position with respect to the band portion 72. Further, at this time, when, for example, a tip 72a of the band portion 72 that has passed through the second insertion portion 856 is pulled with a predetermined force, the force for sandwiching the wire harness 812 by the band component 70 and the support member 840 can be set to a predetermined force.

Note that there may be cases where the tip 72a of the band portion 72 that has passed through the second insertion portion 856 is cut as needed or not cut. In a case where a protruding dimension of the tip 72a of the band portion 72 that has passed through the second insertion portion 856 is large, the tip 72a may interference with surrounding members in the vehicle 90 and is preferably cut.

The regulation portion 74 has a cross section that is formed to be larger than a cross section of the band portion 72. In this manner, in a state where the base end of the band portion 72 is inserted through the first insertion portion 854, the regulation portion 74 abuts on a peripheral edge of the first insertion hole 854h in the first insertion portion 854, and further insertion of the band portion 72 through the first insertion hole 854h is restricted. Here, the regulation portion 74 is formed in a rectangular parallelepiped shape. Note that, as the band component 70 including the band portion 72 and the regulation portion 74, a well-known resin binding band can be used. In this case, like the second insertion portion 856, the regulation portion 74 may be a band fixing portion that can fix the band portion 72. However, even in this case, the tip of the band portion 72 does not need to be fixed to the band fixing portion as the regulation portion 74 as in the example shown in FIG. 18.

Here, the support member 840 is further provided with the positioning projection portion 52 and a band extending direction regulation portion 859. Between these, the positioning projection portion 52 is similar to the positioning projection portion 52 in the fourth embodiment, and will be omitted from the description.

The band extending direction regulation portion 859 is a portion that regulates the extending direction of the band portion 72 extending from the first insertion portion 854. Specifically, the band extending direction regulation portion 859 is provided on an outlet side (here, the outer side of the outlet) of the first insertion hole 854h. An outer surface of the band extending direction regulation portion 859 is continuous with an inner peripheral surface of the first insertion hole 854h and is an inclined surface that is inclined to the outer peripheral side with respect to the axial direction of the first insertion hole 854h. Then, as shown in FIG. 18, the band portion 72 that has passed through the first insertion hole 854h is guided by the inclined surface so as to extend to the outer peripheral side with respect to the support member 840.

Here, in a case where the band extending direction regulation portion 859 is not provided in the support member 840, the band portion 72 that has passed through the first insertion hole 854h may extend along the outer surface of the extending portion 842c. In this case, the wire harness 812 is not easily sandwiched between the support member 840 and the band component 70 on the first insertion portion 854 side.

On the other hand, since the band extending direction regulation portion 859 is provided here, the wire harness 812 is easily sandwiched between the support member 840 and the band component 70 also on the first insertion portion 854 side.

In order to lock the band component 70 at the first insertion portion 854 and the second insertion portion 856, for example, a configuration described below is preferably employed. That is, as shown in FIG. 24, the tip 72a of the band portion 72 is inserted through the first insertion portion 854. At this time, the regulation portion 74 is preferably held by a jig or the like. In this state, the wire harness 812 is disposed along the outer periphery of the support member 840. Here, the wire harness 812 before being disposed is flat, for example, and it is conceivable that the flat wire harness 812 is bent and disposed along the outer periphery of the support member 840. After the above, the tip 72a of the band portion 72 is inserted through and locked in the second insertion portion 856 while the band portion 72 is wound around the outer side of the wire harness 812. At this time, when, for example, the tip 72a of the band portion 72 that has passed through the second insertion portion 856 is pulled with a predetermined force as described above, the force for sandwiching the wire harness 812 by the band component 70 and the support member 840 can be set to a predetermined force.

According to the present aspect, the support member 840 is provided with, as the support portions, the first insertion portion 854 and the second insertion portion 856 into which the band component 70 can be inserted and in which the band component 70 can be locked in a state of being inserted, so that the wire harness 812 can be supported by the support member 840 using the band component 70.

At this time, since the electrical wire 14 is held in a tightly bound state between the band component 70 and the support member 840 by the band component 70, the electrical wire 14 is supported at a fixed position with respect to the support member 840 and hardly moves. In particular, the electrical wire 14 is held so as not to move with respect to the fitting portion 842. In this manner, the occurrence of vibration and rubbing of the electrical wire 14 can be suppressed. Furthermore, the electrical wire 14 is easily maintained in a state of spreading along the outer periphery of the fitting portion 842, so that the electrical wire 14 is easily maintained in a state of spreading along the outer periphery of the bar-shaped member 460 even in a region adjacent to the support member 840 along the longitudinal direction of the bar-shaped member 460 in a state where the support member-attached wire harness 810 is supported by the bar-shaped member 460. In particular, when the electrical wire 14 is held in a tightly bound state between the band component 70 and the support member 840 by the band component 70 in a first location and a second location that are separated from each other along the longitudinal direction of the bar-shaped member 460, the electrical wire 14 is easily maintained in a state of spreading along the outer periphery of the bar-shaped member 460 even in a portion between the first location and the second location.

In particular, since the first insertion portion 854 is formed such that the band portion 72 can be inserted and the regulation portion 74 cannot be inserted, and the second insertion portion 856 is formed such that the band portion 72 can be inserted in one direction and cannot be inserted in the other direction, the wire harness 812 can be supported by the support member 840 using a general-purpose binding band as the band component 70.

Further, according to the present aspect, since the electrical wire 14 is sandwiched between two of the sheet materials 30 and is formed to be flat as a whole, the electrical wire 14 can be made flat even if the electrical wire 14 is not fixed to the sheet material 30.

Note that it is also conceivable to use a band component in which the regulation portion 74 is omitted in the band component 70 and the uneven portion 73 is formed in a region including both end sides of the band portion 72. In this case, the first insertion portion and the second insertion portion are preferably formed in a similar shape as the second insertion portion 856 in which the band lock portion 857 is formed.

Sixth Embodiment

Figure 25:
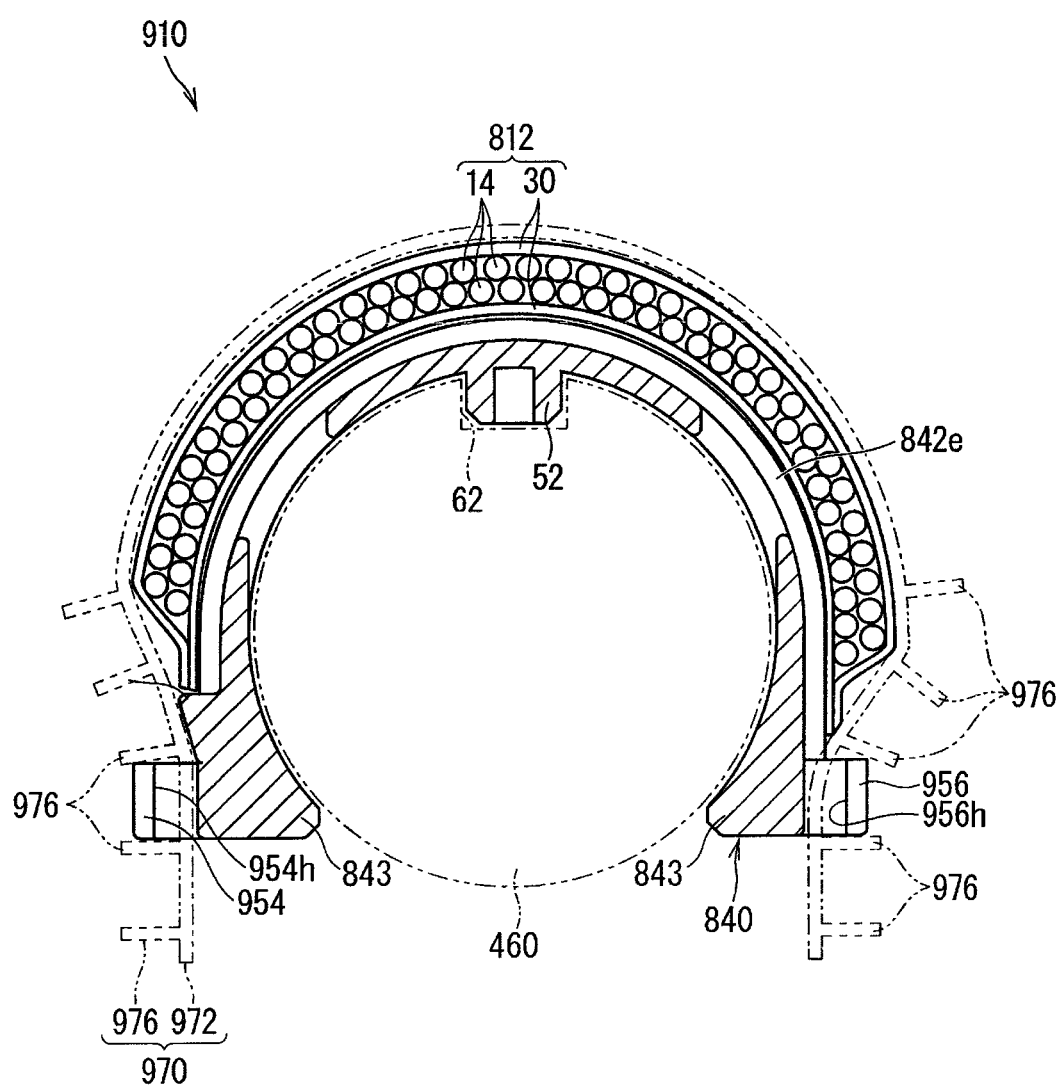
FIG. 25 is a cross-sectional view showing a support member-attached wire harness and a support structure of the support member-attached wire harness according to a sixth embodiment.
Figure 26:
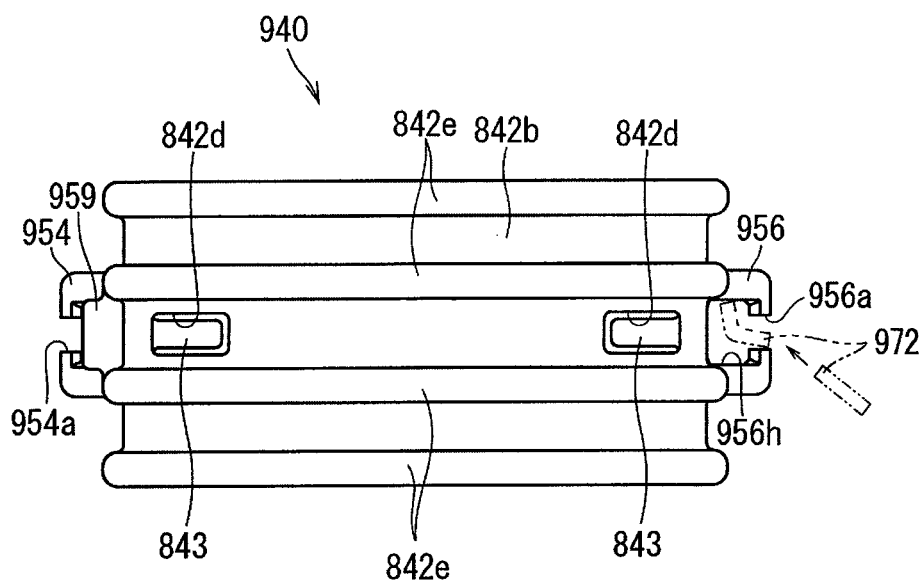
FIG. 26 is a plan view showing a support member according to the sixth embodiment.
Figure 27:
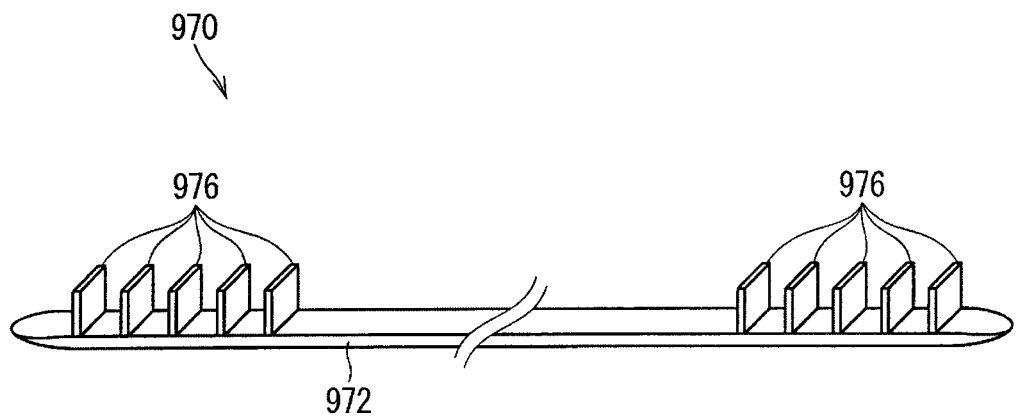
FIG. 27 is a perspective view showing a band component used for the support member-attached wire harness according to the sixth embodiment.
Figure 28:
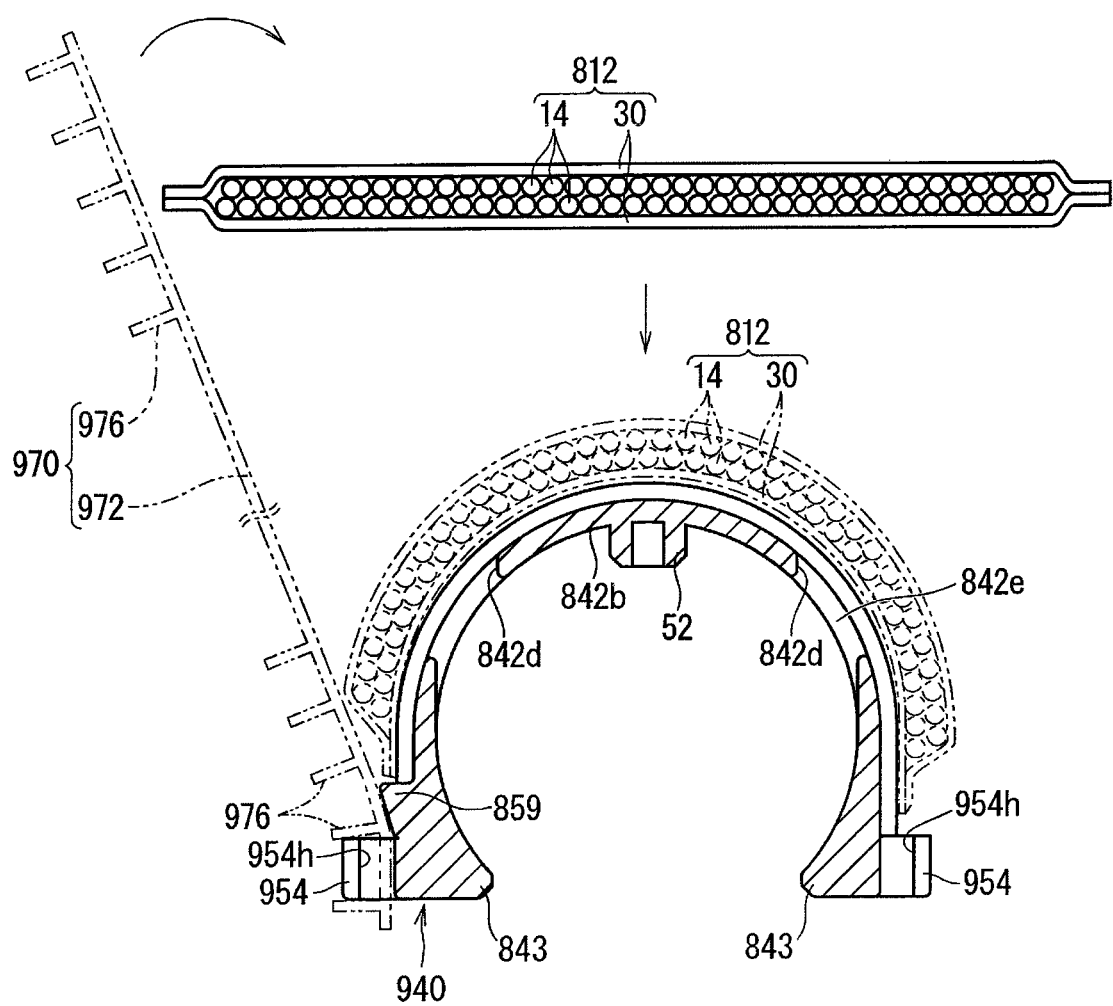
FIG. 28 is an explanatory view showing a state of manufacturing the support member-attached wire harness according to the sixth embodiment.

Next, a support member-attached wire harness and a support structure of the support member-attached wire harness according to a sixth embodiment will be described. FIG. 25 is a cross-sectional view showing a support member-attached wire harness 910 and a support structure of the support member-attached wire harness 910 according to the sixth embodiment. FIG. 26 is a plan view showing a support member 940 according to the sixth embodiment. FIG. 27 is a perspective view showing a band component 970 used for the support member-attached wire harness 910 according to the sixth embodiment. FIG. 28 is an explanatory view showing a state of manufacturing the support member-attached wire harness 910 according to the sixth embodiment. Note that, in the description of the present embodiment, the same constituents as those described above are denoted by the same reference numerals, and will be omitted from the description.

Here, an aspect in which the band component 970 is locked in a first insertion portion 954 and a second insertion portion 956 is different from the aspect in which the band component 70 is locked in the first insertion portion 854 and the second insertion portion 856 in the support member-attached wire harness 810 according to the fifth embodiment.

Specifically, the band component 970 includes a band portion 972 and a protruding piece 976 erected on one main surface of the band portion 972. The protruding pieces 976 are formed in one end portion and the other end portion of the band portion 972. Further, in the one end portion and the other end portion of the band portion 972, the plurality of protruding pieces 976 are formed at intervals along the longitudinal direction of the band portion 972 (here, five for each portion). In this manner, the protruding piece 976 can be selectively locked in the first insertion portion 954 and the second insertion portion 956 at one end portion and the other end portion of the band portion 972, and thus a tightening force of the band component 970 can be adjusted on both end sides. The number of the protruding pieces 976 may differ between the one end portion and other end portion of the band portion 972. For example, in a case where the function of adjusting the tightening force is provided only at the other end portion of the band portion 972, a case where one or two of the protruding pieces 976 are formed in the one end portion of the band portion 972 and three or more of the protruding pieces 976 are formed in the other end portion of the band portion 972 is also conceivable. The band component 970 can be considered as an integrally molded product that is integrally molded of an elastic material, such as rubber.

The first insertion portion 954 and the second insertion portion 956 are formed in similar shapes. Insertion holes 954$h$ and 956$h$ in the first insertion portion 954 and the second insertion portion 956 have a height dimension that is equal to or larger than a thickness dimension of the band portion 972, and is set to be smaller than the sum of a thickness dimension of the band portion 972 and a height dimension of the protruding piece 976. In this manner, a portion of the band portion 972 where the protruding piece 976 is not formed can be inserted into the insertion holes 954$h$ and 956$h$ in the first insertion portion 954 and the second insertion portion 956, while a portion where the protruding piece 976 is formed cannot be inserted.

Further, here, in the first insertion portion 954 and the second insertion portion 956, part from the insertion holes 954$h$ and 956$h$ to the outer surface is opened. Through openings 954$a$ and 956$a$, as shown in FIG. 26, portion of the band portion 972 where the protruding piece 976 is not formed can be introduced into the insertion holes 954$h$ and 956$h$. More specifically, width dimensions of the openings 954$a$ and 956$a$ are set to be smaller than a width dimension of the band portion 972, and the band portion 972 stored in the insertion holes 954$h$ and 956$h$ is not easily removed from the openings 954$a$ and 956$a$. Then, when the band portion 972 is accommodated in the insertion holes 954$h$ and 956$h$, the band portion 972 is bent at a line along the longitudinal direction as shown in FIG. 26 so as to be capable of passing through the openings 954$a$ and 956$a$.

However, each of the protruding pieces 976 may be formed to be elastically deformable so that the height dimension can be reduced by being bent at an intermediate portion in the height direction or being bent at a connecting portion with the band portion 972. In this case, even in a portion of the band portion 972 where the protruding piece 976 is formed, the protruding piece 976 is bent and deformed so that the height dimension of the protruding piece 976 is reduced as described above, so that the band portion 972 can be inserted through the insertion holes 954$h$ and 956$h$ along the axial direction.

Here, the interval between adjacent ones of the protruding pieces 976 in each end portion of the band portion 972 is preferably set to be equal to or larger than dimensions of the insertion holes 954$h$ and 956$h$ along the axial direction.

In order to lock the band component 970 at the first insertion portion 954 and the second insertion portion 956, for example, a configuration described below is preferably employed. That is, as shown in FIG. 28, one end portion of the band component 970 is first locked in the first insertion portion 954. At this time, the first insertion portion 954 is preferably positioned between two of the protruding pieces 976. In this manner, falling of the band component 970 from the first insertion portion 954 before the other end portion of the band component 970 is locked in the second insertion portion 956 can be suppressed. In this state, the wire harness 812 is disposed along the outer periphery of the support member 940. Then, the other end portion of the band component 970 is locked in the second insertion portion 956 while the band component 970 is wound around the outer side of the wire harness 812. At this time, in a case where the band portion 972 is formed of an elastic material, such as rubber, the one end portion and the other end portion are preferably locked in a state where the band portion 972 is elastically deformed so as to be stretched by being pulled in the longitudinal direction. When locking is performed in this way, the tightened state is less likely to loosen. Note that which one of the plurality of protruding pieces 976 is used for locking at one end portion and the other end portion of the band component 970 may be determined in advance according to the dimensions of the wire harness 812 or the like. Alternatively, the protruding piece 976 positioned near the insertion portions 954 and 956 when, for example, the one end portion and the other end portion are pulled with a predetermined force may be used for locking.

Seventh Embodiment

Figure 29:
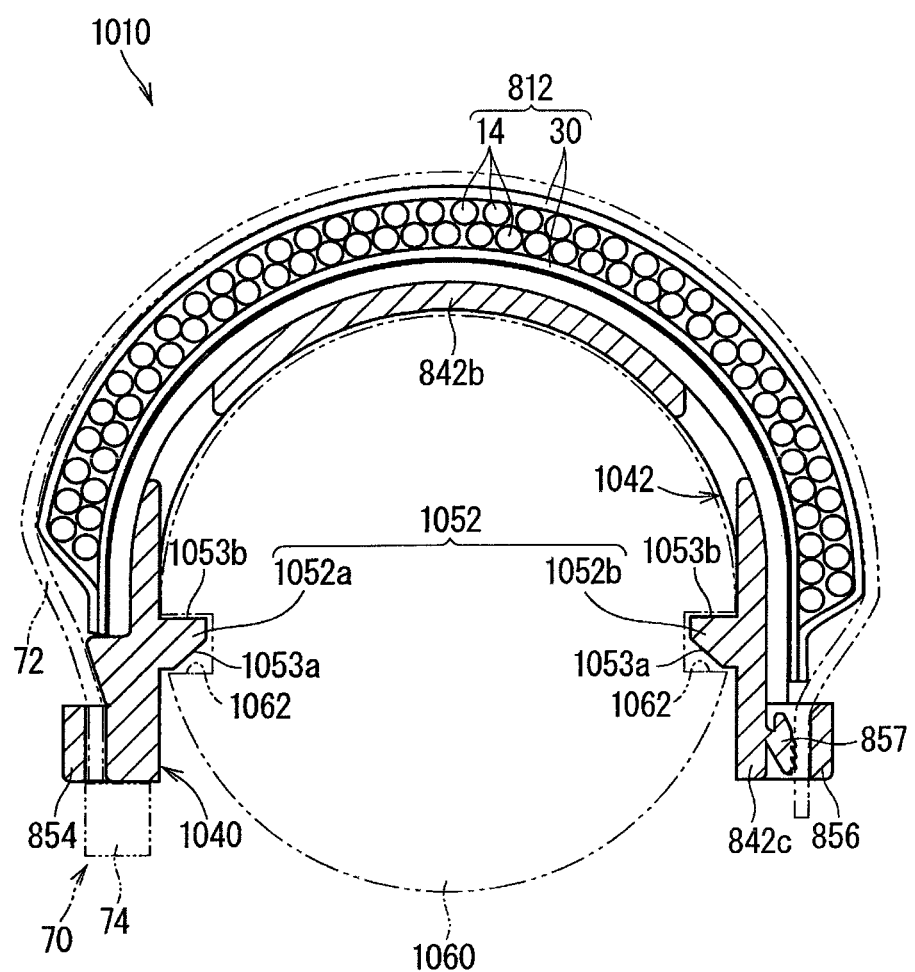
FIG. 29 is a cross-sectional view showing a support member-attached wire harness and a support structure of the support member-attached wire harness according to a seventh embodiment.
Figure 30:
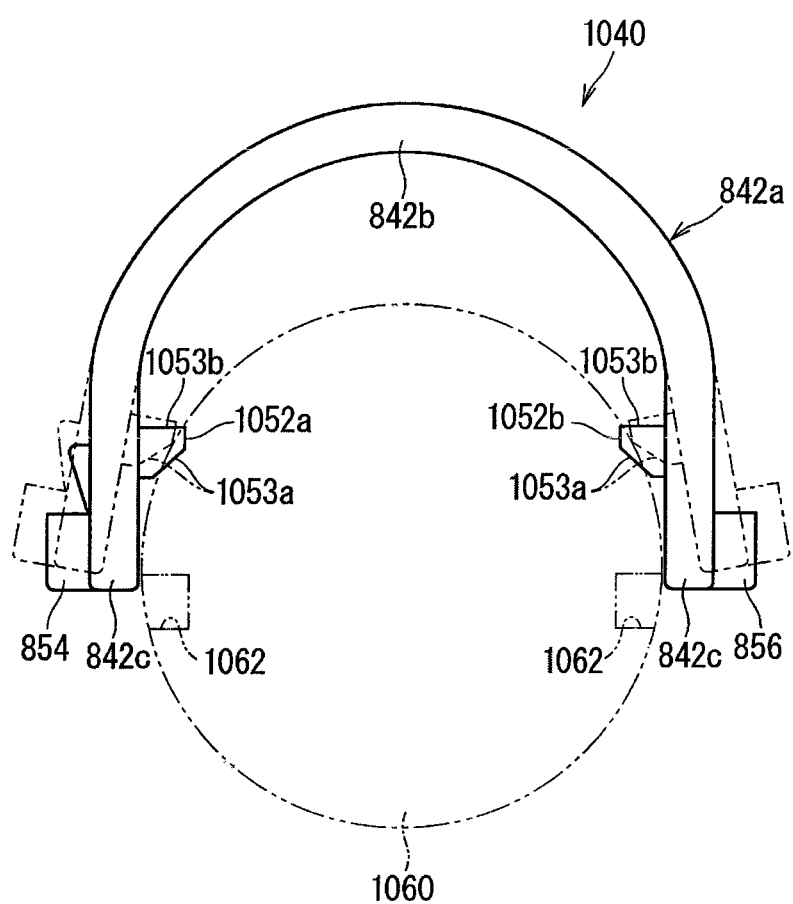
FIG. 30 is a front view showing a support member according to the seventh embodiment.

Next, a support member-attached wire harness and a support structure of the support member-attached wire harness according to a seventh embodiment will be described. FIG. 29 is a cross-sectional view showing a support member-attached wire harness 1010 and a support structure of the support member-attached wire harness 1010 according to the seventh embodiment. FIG. 30 is a front view showing a support member 1040 according to the seventh embodiment. Note that, in the description of the present embodiment, the same constituents as those described above are denoted by the same reference numerals, and will be omitted from the description.

Here, a shape of a positioning projection portion 1052 and a shape of a hole 1062 of a bar-shaped member 1060 corresponding to the positioning projection portion 1052 are different from the shape of the positioning projection portion 52 and the shape of the hole 62 of the bar-shaped member 460 corresponding to the positioning projection portion 52 described above.

Specifically, here, as the positioning projection portion 1052, a pair of fitting positioning projection portions 1052a and 1052b are provided. The pair of fitting positioning projection portions 1052a and 1052b are provided on the support member 1040 instead of a pair of the fitting pieces 843, The fitting positioning projection portions 1052a and 1052b are provided on an inner peripheral surface of portions positioned on the opposite sides across the bar-shaped member 1060 on the fitting portion 1042. The fitting positioning projection portions 1052a and 1052b are stored in the holes 1062 formed on both side portions of the bar-shaped member 1060. In this manner, the fitting portion 1042 can be fitted to the bar-shaped member. Here, the fitting positioning projection portions 1052a and 1052b are provided in a connecting portion between the semi-cylindrical portion 842b and the extending portion 842c of the main body portion 842a or on an inner surface closer to the extending portion 842c side with respect to the connecting portion.

The fitting positioning projection portions 1052a and 1052b are formed in a shape such that, for example, part of a column is cut off. At this time, a surface on the opening portion side where the bar-shaped member 1060 is introduced in the support member 1040 (remaining surface after the cut-off) of the fitting positioning projection portions 1052a and 1052b is a guide surface 1053a formed in a tapered shape. In this manner, when the bar-shaped member 1060 is introduced to the inner peripheral side of the support member 1040 through the opening portion, the guide surface 1053a of the fitting positioning projection portions 1052a and 1052b can first abut on the bar-shaped member 1060. As a result, as shown in FIG. 30, while the fitting positioning projection portions 1052a and 1052b are being stored in the hole 1062 of the bar-shaped member 1060, the support member 1040 is easily elastically deformed so as to widen the opening portion.

Of the fitting positioning projection portions 1052a and 1052b, an outer peripheral side surface 1053b on the opposite side to the guide surface 1053a extends in a direction orthogonal to an introducing direction of the bar-shaped member 1060. In a state where the fitting positioning projection portions 1052a and 1052b are stored in the hole 1062 of the bar-shaped member 1060, the fitting portion 1042 is in a state of being fitted to the bar-shaped member 1060 by the outer peripheral side surface 1053b being hooked on the inner peripheral surface of the hole 1062.

Here, it is conceivable that the fitting positioning projection portions 1052a and 1052b are formed so as to be capable of being press-fitted into the hole 1062 of the bar-shaped member 1060. In this manner, rattling is less likely to occur between the support member 1040 and the bar-shaped member 1060 in a state where the fitting positioning projection portions 1052a and 1052b are stored in the hole 1062 of the bar-shaped member 1060. However, as the configuration for suppressing rattling between the support member 1040 and the bar-shaped member 1060 in the state where the fitting positioning projection portions 1052a and 1052b are stored in the hole 1062 of the bar-shaped member 1060, a configuration other than press-fitting is also conceivable. For example, the support member 1040 may be fitted to the bar-shaped member 1060 in a state where the support member 1040 is elastically deformed so that the opening portion is slightly widened in a configuration in which, for example, the inner peripheral surface of the support member 1040 is formed to be slightly smaller than the outer peripheral surface of the bar-shaped member 1060.

According to the present aspect, since the fitting positioning projection portions 1052a and 1052b are provided as the positioning projection portions 1052, a configuration for fitting and a configuration for positioning do not need to be provided separately. Further, since the fitting structure between the fitting positioning projection portions 1052a and 1052b and the hole 1062 is set to the side portion of the bar-shaped member 1060, an operator can easily recognize the fitting positioning projection portions 1052a and 1052b and the hole 1062 as compared to the case where the fitting structure between the positioning projection portion 52 and the hole 62 is provided in an upper portion (the central portion of the support member 440) of the bar-shaped member 460, and thus the fitting work is facilitated.

Further, since the outer peripheral side surface 1053b used for locking the fitting positioning projection portions 1052a and 1052b is perpendicular to the introducing direction of the bar-shaped member 1060, elastic deformation is less likely to occur in a manner that the opening portion widens even if a force is applied in the direction in which the bar-shaped member 1060 is removed from the support member 1040 as compared to the case where the support member 840 and the bar-shaped member 460 are fitted using the fitting piece 843 having a locking surface formed in a shape along the outer surface of the bar-shaped member 460, and thus the fitting state is less likely to be eliminated.

Eighth Embodiment

Figure 31:
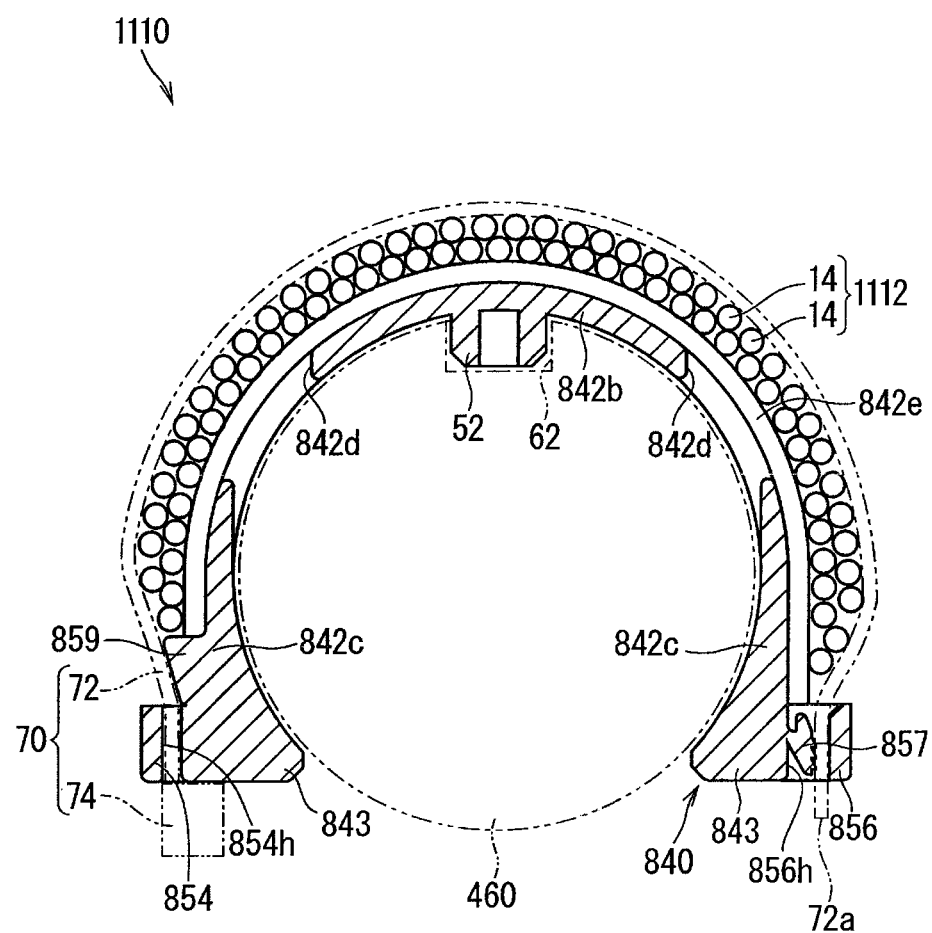
FIG. 31 is a cross-sectional view showing a support member-attached wire harness and a support structure of the support member-attached wire harness according to an eighth embodiment.

Next, a support member-attached wire harness and a support structure of the support member-attached wire harness according to an eighth embodiment will be described. FIG. 31 is a cross-sectional view showing a support member-attached wire harness 1110 and a support structure of the support member-attached wire harness 1110 according to the eighth embodiment.

The support member-attached wire harness 1110 according to the present aspect is an example where the sheet material 30 is omitted in a wire harness 1112 in a case where the wire harness is supported by the support member using the band component as in the fifth to seventh embodiments. In the example shown in FIG. 31, the support member-attached wire harness 1110 has a configuration in which the sheet material 30 is omitted from the support member-attached wire harness 810 according to the fifth embodiment. In a case where the sheet material 30 is omitted, the electrical wires 14 are directly arranged on the outer periphery of the support member 840 as shown in FIG. 31.

At this time, a portion of the electrical wire 14 near the portion sandwiched between the band component 70 and the support member 840 is preferably maintained in a fixed shape by being connected to the connector, held by the sheet material 30, or bundled so as to exhibit a round cross-sectional shape as shown in FIG. 16. In this manner, the portion of the electrical wire 14 sandwiched between the band component 70 and the support member 840 can be easily aligned along the outer periphery of the fitting portion 842. As a matter of course, the portion of the electrical wire 14 near the portion sandwiched between the band component 70 and the support member 840 does not need to be held in a fixed shape.

Note that, the configurations described in the above embodiments and variations can be combined as appropriate unless the configurations contradict each other. For example, in the first to fourth embodiments, only the support portion that combines the locking projection portion 44 has been described. However, this configuration is not essential. The support portion may be only the recess 34, only the connector locking portion 48, or a combination of the recess 34 and the connector locking portion 48. Further, in one corner, the support portion may be constituted by a plurality of the locking projection portion 44, the recess 34, and the connector locking portion 48. Further, for example, in the support member-attached wire harness 710 shown in FIG. 17, one of the support members 740 can be any of the support members 840, 940, and 1040 according to the fifth to seventh embodiments. Further, for example, the fitting positioning projection portions 1052a and 1052b can be applied to the support member according to each embodiment. Further, for example, it is conceivable that the fitting piece 843 is employed on one end side of the support member, and the fitting positioning projection portion 1052a (1052b) is employed on the other end side.

Although the present invention has been described above in detail, the above explanation is exemplary in all the aspects, and the present invention is not limited to the explanation. It is understood that countless variations that are not exemplified are conceivable without departing from the scope of the present invention.

EXPLANATION OF REFERENCE SIGNS

10: support member-attached wire harness
12: wire harness
14: electrical wire
16: connector
18: main body portion
19: cavity
20: cassette portion
23: locking recess
28: bundling member
30: sheet material
32: hole
34: recess
35: bottom
38: thread
40: support member
42: fitting portion
44: locking projection portion
46: locking protrusion
48: connector locking portion
50: locking piece
52: positioning projection portion
60: bar-shaped member
62: hole
70: band component
72: band portion
74: regulation portion
90: vehicle
92: instrument panel

The invention claimed is:

1. A support member-attached wire harness comprising:
a wire harness including an electrical wire and a sheet material that holds the electrical wire; and
a support member including a fitting portion formed in a partially cylindrical shape that is opened partially in a circumferential direction so as to be capable of being fitted to an outer peripheral portion of a bar-shaped member, wherein
a support portion for supporting the wire harness disposed along outer periphery of the fitting portion at a fixed position with respect to the fitting portion is formed on at least one of the wire harness and the support member, and
the support portion having a free end that protrudes to an exterior of the sheet material.

2. The support member-attached wire harness according to claim 1, wherein
the support portion includes a locking projection portion which protrudes toward an outer peripheral side from the fitting portion and is locked in a state of penetrating the sheet material.

3. The support member-attached wire harness according to claim 1, wherein
the support portion further includes a first insertion portion and a second insertion portion that are provided at both end sides in a circumferential direction of the support member and where a band component is capable of being inserted,
the support member-attached wire harness further comprising a band component that is inserted into and locked at the first insertion portion and the second insertion portion in a state where the wire harness is sandwiched between the band component and an outer peripheral surface of the support member.

4. The support member-attached wire harness according to claim 3, wherein
the band component includes a band portion on which an uneven portion is formed, and a regulation portion that is provided at a base end of the band portion and has a cross section formed to be larger than a cross section of the band portion,
the first insertion portion is formed such that the band portion is capable of being inserted into the first insertion portion and the regulation portion is incapable of being inserted into the first insertion portion, and a band lock portion that is capable of being locked at the uneven portion such that the band portion is capable of being inserted into the second insertion portion in one direction and is incapable of being inserted into the second insertion portion in the other direction is formed in the second insertion portion.

5. The support member-attached wire harness according to claim 1, wherein the support member further includes a positioning projection portion that protrudes from the fitting portion toward an inner peripheral side and is capable of being stored in a hole formed on the bar-shaped member.

6. The support member-attached wire harness according to claim 5, wherein the positioning projection portion includes a pair of fitting positioning projection portions that are provided on inner peripheral surfaces of portions positioned on opposite sides across the bar-shaped member on the fitting portion, and allow the fitting portion to be fitted to the bar-shaped member by being stored in the hole formed on the bar-shaped member.

7. The support member-attached wire harness according to claim 1, wherein the electrical wire is fixed to the sheet material by sewing or welding.

8. The support member-attached wire harness according to claim 1, wherein the electrical wire is formed to be flat as a whole by being sandwiched between two of the sheet materials.

9. A wire harness support structure comprising:

the support member-attached wire harness according to claim 1; and the bar-shaped member to which the fitting portion of the support member-attached wire harness is fitted.

10. The wire harness support structure according to claim 9, wherein an end portion of the sheet material is sandwiched between the bar-shaped member and the fitting portion.

11. The wire harness support structure according to claim 9, wherein the bar-shaped member is a reinforcement disposed on a back side of an instrument panel in a vehicle.

12. A support member-attached wire harness comprising:

a wire harness including an electrical wire; and a support member including a fitting portion formed in a partially cylindrical shape that is opened partially in a circumferential direction so as to be capable of being fitted to an outer peripheral portion of a bar-shaped member, wherein a support portion for supporting the wire harness disposed along outer periphery of the fitting portion at a fixed position with respect to the fitting portion is formed on at least one of the wire harness and the support member, wherein the wire harness includes a sheet material that holds the electrical wire, and the support portion includes a recess formed on an inner peripheral side of the sheet material, the recess into which an end portion of the fitting portion is inserted.

13. The support member-attached wire harness according to claim 12, wherein the recess is formed in a bag shape.

14. A support member-attached wire harness comprising:

a wire harness including an electrical wire; and a support member including a fitting portion formed in a partially cylindrical shape that is opened partially in a circumferential direction so as to be capable of being fitted to an outer peripheral portion of a bar-shaped member, wherein a support portion for supporting the wire harness disposed along outer periphery of the fitting portion at a fixed position with respect to the fitting portion is formed on at least one of the wire harness and the support member, wherein the wire harness further includes a sheet material that holds the electrical wire and a connector that is connected to an end portion of the electrical wire and positioned in an end portion of the sheet material, and the support portion includes a connector locking portion which protrudes toward the outer peripheral side from the fitting portion, the connector locking portion at which the connector is locked.

15. The support member-attached wire harness according to claim 14, wherein the end portion of the sheet material is sandwiched between the connector and the fitting portion.

* * * * *